United States Patent [19]

Smith

[11] 4,030,351

[45] June 21, 1977

[54] METHOD AND APPARATUS FOR LABORATORY TESTING OF CARBURETORS

[75] Inventor: Richard Lawrence Smith, Livonia, Mich.

[73] Assignee: Scans Associates, Inc., Livonia, Mich.

[22] Filed: Nov. 17, 1975

[21] Appl. No.: 633,022

[52] U.S. Cl. .................................................. 73/118

[51] Int. Cl.[2] .......................................... G01M 19/00

[58] Field of Search ........................ 73/118, 119 R, 3

[56] References Cited

UNITED STATES PATENTS

| | | | |
|---|---|---|---|
| 3,434,341 | 3/1969 | Zaske | 73/118 |
| 3,524,344 | 8/1970 | Converse et al. | 73/118 |
| 3,646,600 | 2/1972 | Bier et al. | 73/118 |
| 3,691,824 | 9/1972 | Vanderbilt et al. | 73/118 |
| 3,851,523 | 12/1974 | Converse et al. | 73/118 |

*Primary Examiner*—James J. Gill
*Assistant Examiner*—Anthony V. Ciarlante
*Attorney, Agent, or Firm*—Dolgorukov & Dolgorukov

[57] ABSTRACT

The specification discloses a method and apparatus forlaboratory testing of carburetors to determine the mass air flow rate and mass fuel flow rate through the carburetor at any desired test point by providing, in addition to the normally required systems, an improved manifold vacuum control system for producing a predetermined air flow at a given manifold vacuum, and an improved hood pressure control system which enables carburetor testing to take place at test points which correspond to different altitudes in which the carburetor may be used. In addition, by providing that these systems be computer controlled, the three-mode controllers normally associated with producing air flow and controlling hood pressure are replaced by a computer which provides output control signals corresponding to that which would be provided by three-mode controllers where the values of rate, reset and proportion are continuously and automatically changed to the optimum value for each test point. In this way it is now possible to perform the laboratory carburetor test completely automatically at many test points in the carburetors operating range more quickly, accurately and reliably, whether or not testing is required at sea level or at any altitude within practicable limits.

90 Claims, 28 Drawing Figures

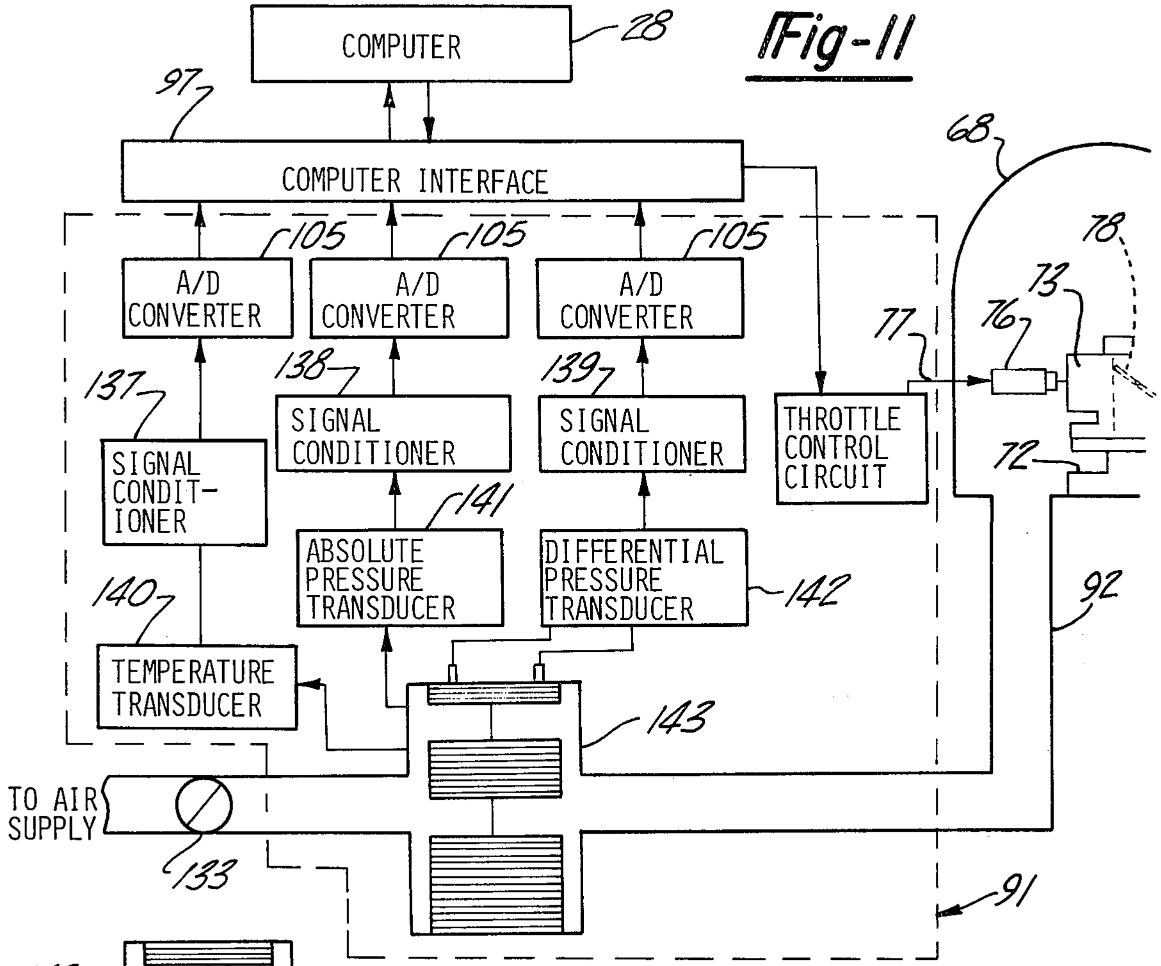
Fig-11
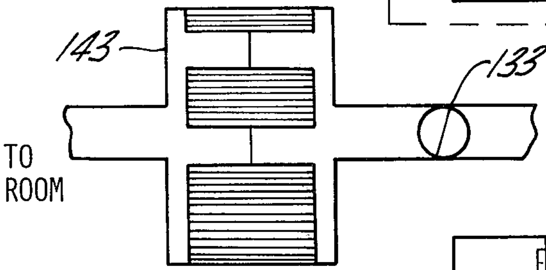
Fig-12
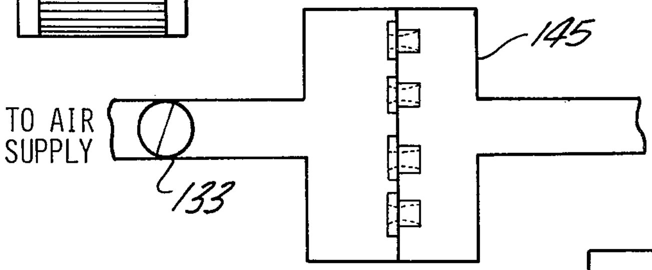
Fig-13
Fig-14
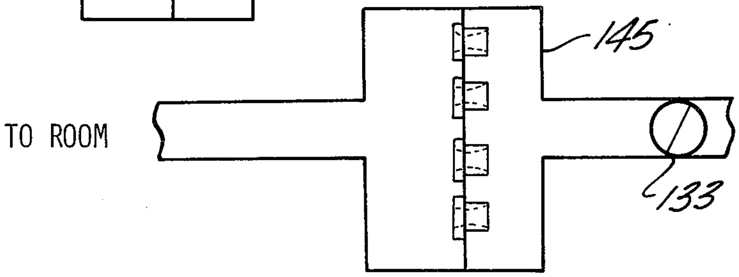

Fig-19
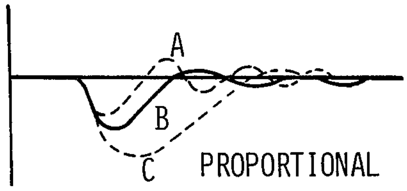
Fig-20
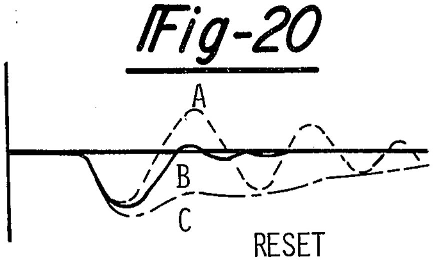
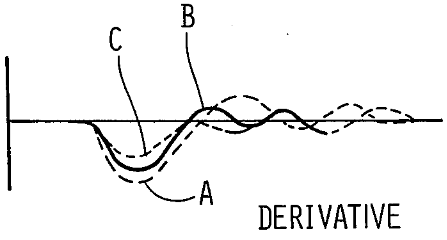
Fig-21
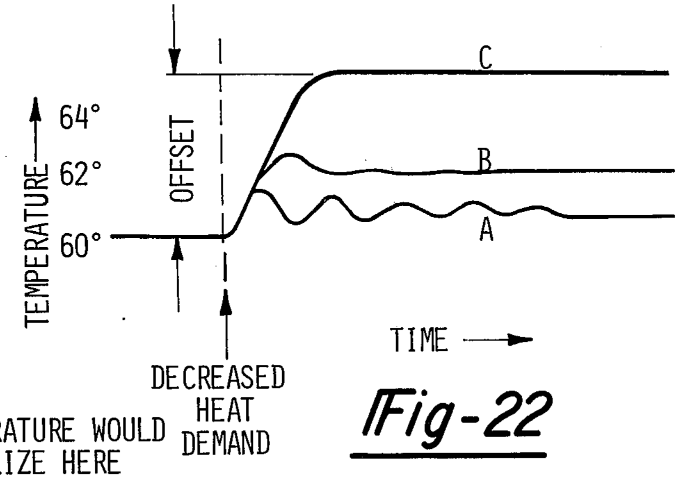
Fig-22
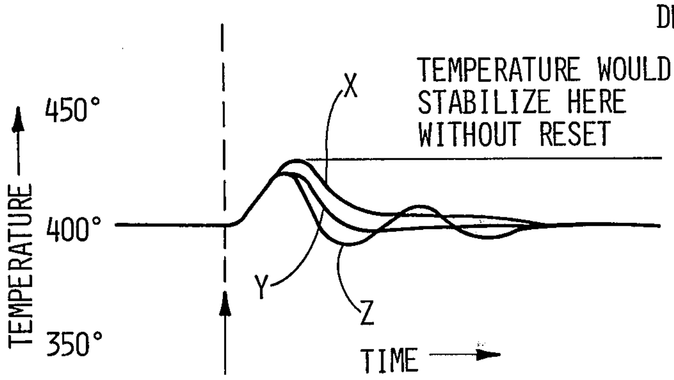
Fig-23
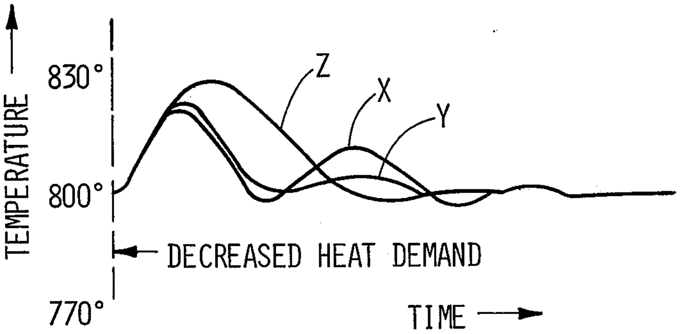
Fig-24

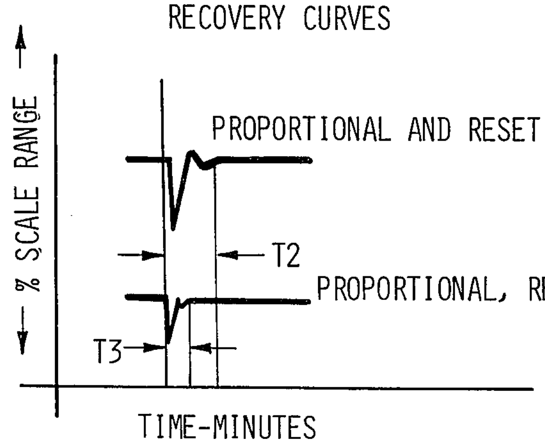
Fig-25
Fig-26
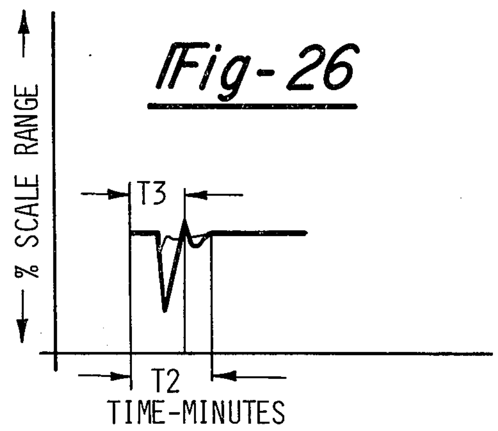
Fig-27
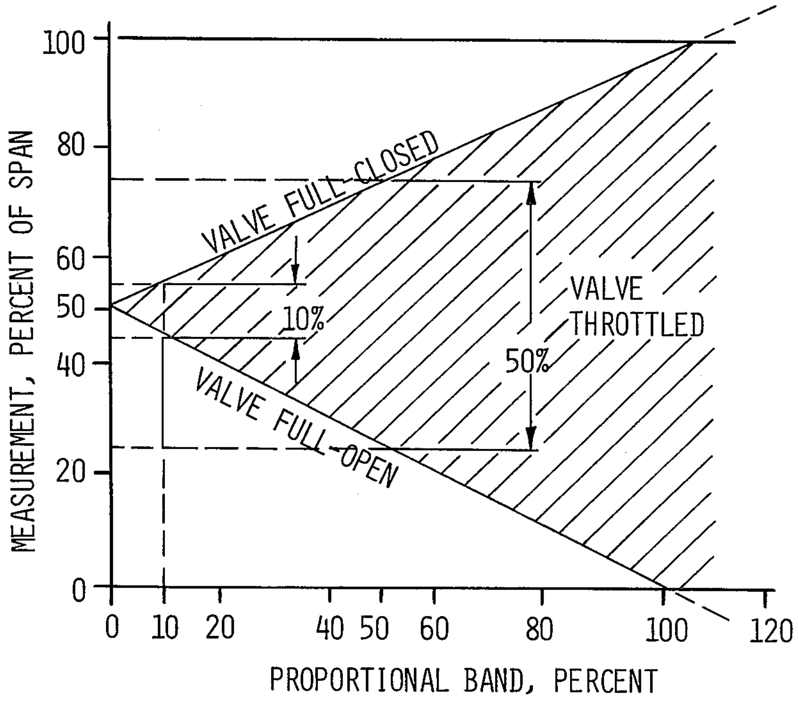

METHOD AND APPARATUS FOR LABORATORY TESTING OF CARBURETORS

This invention relates to a method and apparatus for laboratory testing of carburetors to determine the air/fuel ratio thereof, and more particularly to a completely automated apparatus for performing such testing.

I have been, for many years, engaged in the production of carburetor test stands and the like for testing carburetors both on the production line to determine if a carburetor meets a predetermined standard and also for the laboratory testing of carburetors to determine the absolute flow values of fuel and air through the carburetor, from which standards for production testing of carburetors may be established.

It is obvious from the above that there are different considerations when working in production testing of carburetors than are present in laboratory testing. In production testing when you are given standards by the carburetor manufacturer which all the mass produced carburetors are to be measured against, you are interested mainly in speed of testing together with good accuracy, but the accuracy need not be quite so great as in the laboratory test which establish the standard in the first instance.

Therefore, in the interest of rapid production testing, one can test the carburetors using sonic flow wherein a predetermined mass flow rate of air can be established through a critical venturi meter, a variable area critical venturi meter, or the like, since once the meter goes critical the mass flow rate is directly proportional to the upstream pressure. Once the mass flow rate is established, the carburetor throttle plate is rotated to produce a given manifold vacuum, and at this point since the mass flow rate of air through the carburetor is known and the mass fuel flow rate is easily measured, the air/fuel ratio of the carburetor could be easily measured.

An excellent history of the evolution of carburetor production test stands showing the problems presented to the art and their solutions can be found in U.S. patent application Ser. No. 433,320, filed June 25, 1974, for "Method and Apparatus for Reproducing Operating Conditions in Induced Flow Devices" of which I was the co-inventor with Peter J. Mosher.

While I do not intend to repeat such history, a brief summary is in order because of the parallel evolution of carburetor laboratory testing stands which will be discussed below.

By the time that the production testing of a carburetor was more or less standardized and testing took place at four or more points of the operation range of the carburetor, Applicant's assignee was a leading manufacturer in the testing equipment field and patented a carburetor testing system based on sonic flow in which the air mass flow rate was set as previously described and the manifold vacuum was set by rotating the carburetor plate by means of a pneumatic throttle positioner, with the calculation of the air/fuel ratio also performed as previously described.

However, since the great variable in production testing of carburetors is not the setting of the air flow, or the measuring of the fuel flow, but the setting of the throttle position, the requirements of testing carburetors at faster and faster rates of speed soon made the production test stand with the pneumatic throttle positioner unsatisfactory for some applications.

To increase speed, the pneumatic throttle positioner was replaced with an electric throttle positioner which could arrive at the desired manifold vacuum much more quickly. In addition, for greater flexibility in setting the mass air flow rate, the multiple critical venturi meters previously used were replaced with variable area critical venturi meters.

However, the need to test carburetors at still faster rates of speed soon led to the replacement of the single speed electric throttle positioner with a dual speed positioner, wherein the throttle plate would move faster between test points and slower as the test point was approached to prevent overshoot. This in turn was replaced by a proportional control of the carburetor throttle position described in the previously mentioned application Ser. No. 483,320.

Just as in the past, where requirements for faster and faster production testing of carburetors led to the evolution of the production test stand as just described, so are today's requirements leading to the same type of evolution in the laboratory carburetor testing stand. The need for greater and greater research and development work on carburetors to control engine emissions is leading to the need for more and more testing of prototype carburetors, and this in turn is leading to the need for faster laboratory carburetor tests not heretofore needed.

However, for understanding such evolution of laboratory carburetor test stands, the problems presented to the art, and how they have been solved by the present invention, it is necessary to understand the three basic types of laboratory tests. The first type of test involves the laboratory testing of the carburetor at many test points, each specifying a manifold vacuum, air flow, and hood pressure, and determining the mass air flow rate and mass fuel flow rate at the specific point to arrive at an air/fuel ratio.

The second type of test is what is known as a "Balanced Box" carburetor test, in which at all test points other than at idle and wide open throttle, the manifold vacuum present is a function of the characteristics of the vacuum pump.

The third type of carburetor test is the constant manifold vacuum test in which one would flow at a single manifold vacuum for all test points, with the only flexibility being that of different throttle positions.

In laboratory testing, since it is common to use subsonic flow, the carburetor throttle plate is set at a desired position such as idle, and an air flow is established through the carburetor until the desired manifold vacuum is reached. At this point the mass flow rate of air can be determined by the differential pressure across the carburetor and once this is obtained the air/fuel ratio could be measured. In the first laboratory test stand with which I am familiar, an all pneumatic stand was used, and the air flow was established through seven or eight subsonic nozzles which had to be used one at a time in connection with individual scales on an inclinometer, with the differential pressure across each nozzle being read on said inclinometer. Such a stand had no hood pressure control so that not tests at altitude could be made, and all tests were of the Balanced Box type. Obviously such a stand offered little flexibility, was slow in operation, and because it was pneumatic, was difficult to work with due to the sensitive nature of the pneumatic measuring devices.

While such a stand is still used today where a relatively slow test with little flexibility is acceptable, the requirement for greater accuracy soon forced changes in laboratory test stands. The first step in the evolution of the laboratory test stand was to replace the subsonic nozzle with laminar flow tubes, in which the mass flow rate of air could be calculated faster and and much more accurately by measuring the differential pressure across the flow tubes. This advance coupled with the replacement of the glass tube fuel flow meter enabled the air/fuel ratio to be calculated much more quickly and accurately, and solved a major problem in the carburetor testing art.

In an attempt to perform the laboratory test even more quickly, an attempt was made to go to sonic flow for carburetor testing. As mentioned in connection with production test stands, by setting the mass air flow rate through the carburetor downstream thereof, and then merely rotating the throttle plate to get the desired manifold vacuum, one does perform a much quicker test. Also, by using sonic flow one can perform tests without the need for a carburetor hood. However, as advantageous as this proved to be, it also proved to be rather expensive, as a computer was necessary for the calculation and setting of air flow. Thus, for practical reasons, it was felt absolutely necessary to offer a less expensive test stand based on subsonic flow, but a major problem in offering such a test stand was to achieve the accuracy that was achieved with the computer controlled sonic flow. For this reason the next step was to develop an electronic carburetor test stand using a Flo-tron to measure the mass flow rate of fuel and the laminar flow tubes previously described to measure the mass air flow rate, and to completely eliminate pneumatic signals so the test stand is more accurate and easy to service.

Also to achieve the flexibility of the sonic test stand, a manifold vacuum control system was provided, and, therefore, one was able to perform all three types of carburetor tests previously described. For the Balanced Box type of test, this provided a laboratory test stand that was only slightly slower in operation than the sonic test system, but offered the flexibility of performing the other types of tests, while significantly slower, at a much lower price.

This stand solved the long standing problems in the art of how to produce a reasonably priced, an accurate, and flexible test stand, and this stand became widely accepted in the carburetor testing field and has been in use for many years, and was flexible enough to meet all demands of the carburetor testing technology to the present date.

In some instances where faster speed was required, such a stand could be computer operated, although such operation did not achieve any new result, but did achieve a slightly faster speed.

In the past, the most common type of test was the Balanced Box type as this represented the best compromise between a test which was relatively simple and easy to perform and the ability to test at a large number of test points which gave a reasonable approximation to operating conditions. Also, such a test did not require control of manifold vacuum.

However, as requirements for greater accuracy continued to be felt, it became more and more desirable to test carburetors at points representing actual operating conditions, including testing the carburetors at points representing operation at different altitudes. This then required more and more use of a test which tested the carburetor at many specific test points, including test points simulating altitude, which were made possible by a hood pressure controller.

It was quickly found that such tests were not practical on the stands available in the prior art because of the lack of an adequate method of controlling manifold vacuum and hood pressure.

Inevitably, however, present day technology in a manner similar to that described in regard to the production test stands forced a search for a way to make a still faster laboratory test of a carburetor. Since by this stage in the carburetor laboratory testing art, the finding of fuel flow and the computing of the air/fuel ratio once mass flow rate of air was determined and the mass flow rate of fuel measured was quickly done, it was obvious to me that any increase of speed in laboratory carburetor testing would have to come about because of better control of air flow in the test stand. It can be seen that air flow is a major facotr in the setting of hood pressure and in setting of the manifold vacuum.

Basically, the setting of hood pressure involved the setting of air flow through a valve operated by a controller, and since said valve and controller mechanism had to be able to operate quickly when any changes in hood pressure occurred which were required by the test points of the carburetor, and further since air measurement is a difficult process to control, the controllers used in the old system were what is known as three-mode controllers in which the air flow through the hood pressure measurement and control system of the test stand was controlled through a combination of proportional, reset, and rate control. While such terms will be described further later in the specification, it can not be over emphasized that since a combination of all three modes of control were made, the control of air flow presented a most difficult problem in the art.

To illustrate this problem it is sufficient to say that there is a optimum value for each air flow for the values of proprotional, reset, and rate, and in the old system the practice was to use a purchased product which had these values set, and such values were at best a compromise, and were only near the optimum values for one test point. As soon as you would go to another test point, the fact that you did not now have the optimum values would cause one of two very serious situations to occur. Either the system would take a very long time to arrive at the new desired value of hood pressure, or the system would cycle and perhaps never arrive at the desired value.

A similar but even more serious problems arises in the setting and controlling of manifold vacuum between different test points. For example, if you are performing tests in which you desire to keep the manifold vacuum constant for all test points, each time you move to a new test point, and in a laboratory test there may be several test points at which you desire to test the carburetor, each time one moved the carburetor throttle plate to a new position an upset would occur in the system which is controlling the manifold vacuum, and obviously, if you desire the test to proceed quickly, this upset must be corrected as quickly as possible.

The problem here is similar to the problem just described in the hood pressure control system, as each test point will have optimum values of rate, reset and proportion which would correct the upset in the system as quickly as possible. However, the lack of optimum values for each test point is even more serious in the manifold vacuum control system than it is in the hood pressure control system as two valves, a manifold vacuum in-line valve with a three-mode controller and a manually operated bypass valve, to be described in more detail later, are customarily used. In addition, as the manifold vacuum is changed, the hood pressure will also change, thus it is even more critical in manifold vacuum control area to be able to supply new values of rate, reset, and proportion to the controllers for each test point. To do this in the old system, even if you replace the stock controllers for hood pressure and manifold vacuum with controllers having the capability of multiple predetermined settings, it would require many potentiometers and relays or switches and a complete new system capable of determining when the various settings should be used. Such a special system would be enormously complex and very expensive, requiring analysis of the hood pressure manifold vacuum and air flow conditions, determining which settings are needed, and still undetermined would be the number of settings required.

Thus, one of the objects of the present invention is to provide an improved method and apparatus for the laboratory testing of carburetors whereby the above difficulties and disadvantageous are overcome and largely eliminated, and a much simplier and faster and more accurate carburetor testing system is thus produced at a reasonable cost.

Another object of the present invention is to provide a carburetor testing system which is capable of testing carburetors rapidly at several points within their operating range quickly and accurately.

Another object of the present invention is to test carburetors in the above mentioned manner and provide a system for controlling the manifold vacuum in the carburetor at each test point which is accurate and which can establish different manifold vacuum through the carburetor in a rapid manner.

A further object of the present invention is to provide a manifold vacuum measurement and control system for laboratory testing of carburetors in which the establishment of the manifold vacuum through the carburetor is aided by the in-line and bypass valves being controlled by three-mode controllers.

A still further object of the invention is to provide that the three-mode controllers for the in-line and bypass valves have the capability of multiple predetermined settings of rate, reset and proportion so that any upset in the manifold vacuum measurement and control system can be dealt with in the most rapid manner possible.

A still further object of the present invention is to provide for the three-mode controllers of the present invention to be assisted by a computer so that the optimum settings of rate, reset and proportion will be provided to the controllers for each test point in the operating range of the carburetor being tested.

Another object of the present invention is to provide a laboratory carburetor test stand having a manifold vacuum measurement and control system of the above described nature.

Another object of the present invention is to provide the test stand described above with a hood pressure control system wherein the controller used in such system is a three-mode controller having the capability of multiple settings of rate, reset, and proportion, and further providing that such system is computer assisted so that optimum values of rate, reset and proportion are supplied to the controller for each test point.

A still further object of the present invention is to provide a laboratory test stand having, in addition to the hood pressure and manifold vacuum measurement and control systems, air flow and fuel flow control systems, all of which are computer assisted and are unified into a complete laboratory carburetor test stand having the purpose of providing accurate determinations of the air/fuel ratio of a test carburetor at multiple test points in a most accurate and rapid manner.

A still further object of the present invention is to provide the unified test stand described immediately above which by virtue of computer control makes the supplying of optimum values of rate, reset, and proportion for each carburetor test point feasible, is relatively inexpensive, and is dependable in operation.

Further objects and advantages of this invention will be apparent from the following descriptions and appended claims, reference being had to the accompanying drawings forming a part of this specification, wherein like reference characters designate corresponding parts in the several views.

FIG. 11 is a diagrammatic view of the air flow measurement and control system as shown in FIG. 4 utilizing laminar flow tubes to measure the air flow.

FIG. 12 is a partial diagrammatic view showing the interchanging of the laminar flow tubes and hood pressure valve shown in FIG. 11 to adapt the air flow measurement and control system shown therein for use in the system of FIG. 5 in a controlled atmosphere room.

FIG. 13 is a partial diagrammatic view showing the substitution of subsonic nozzles for the laminar flow tubes shown in FIG. 11.

FIG. 14 is a view substantially similar to FIG. 13, except showing the position of the subsonic nozzle and the hood pressure valve as being reversed for use in the system shown in FIG. 5.

FIG. 19 is a graph showing the effect of low, correct and high settings for the proportional band of a three-mode controller.

FIG. 20 is a graph showing the effects of the low, correct or high settings for the reset times on a three-mode controller.

FIG. 21 is a graph showing the effect of the low, correct or high settings of a derivative time on a three-mode controller.

FIG. 22 is a graph corresponding in part to FIG. 19 and showing the effects of choosing too wide, too narrow and correct proportional bands on a difficult to control process, and the resulting offset which occurs.

FIG. 23 is a graph of the effects of choosing too short, too long and the correct reset time in a process having a proprotional plus reset control.

FIG. 24 is a graph of the effects of choosing too short, too long, and correct derivative time shown on a proportional plus reset plus derivative controller.

FIG. 25 is a graph showing the difference in recovery time between a two-mode controller and a three-mode controller.

FIG. 26 is a graph corresponding to that shown in FIG. 25 with the two curves superimposed on each other for better comparison.

FIG. 27 is a graph showing the relationship between valve position and change in measurement for different values of proportional band.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of illustration and not of limitation.

Figure 1:
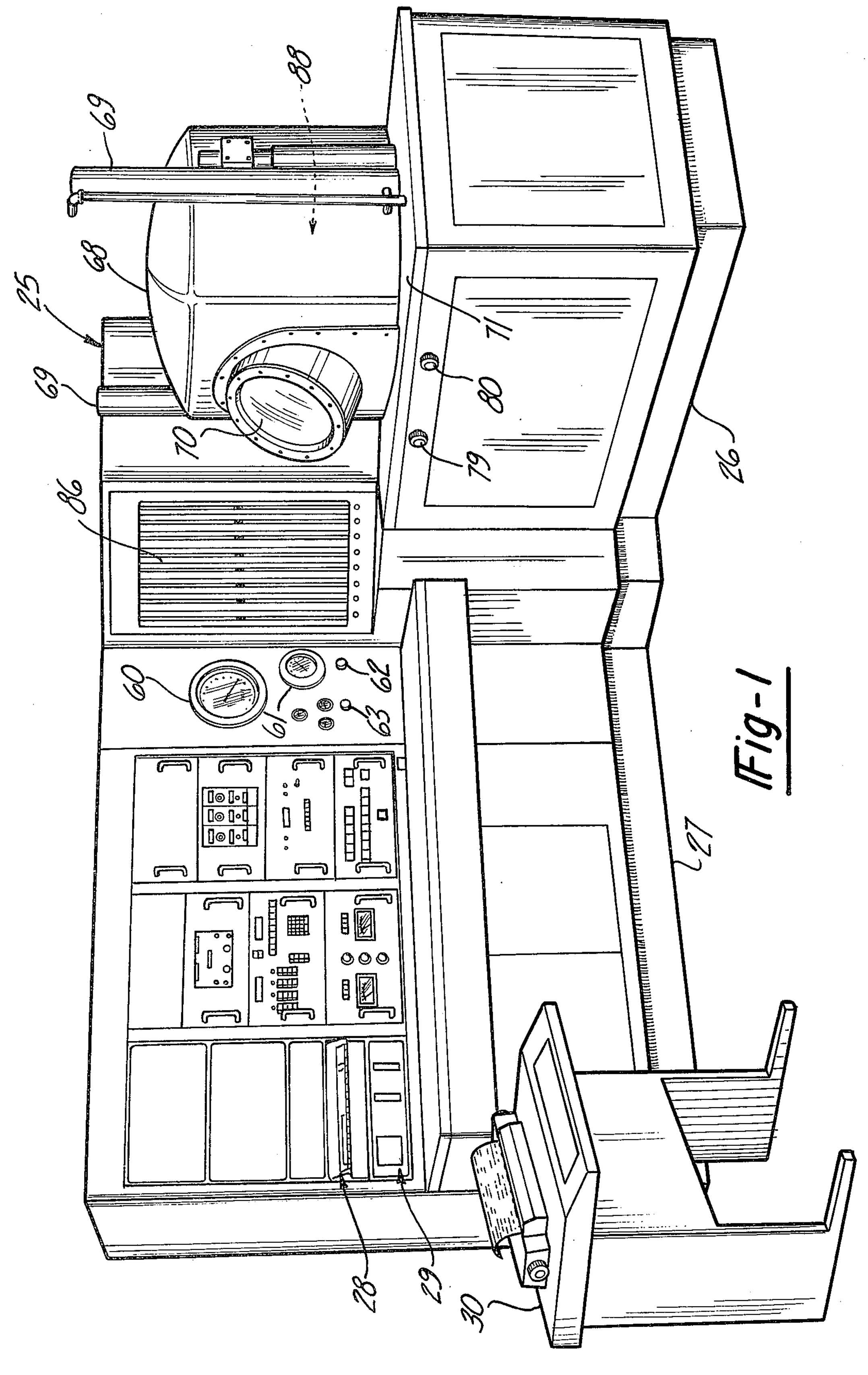
FIG. 1 is a perspective view of a test stand embodying the construction of the present invention.

The present invention is embodied in a test stand generally designated by the numeral 25. In turn the test stand consists of a flow stand portion 26 generally shown as the right hand portion of FIG. 1, and a console section 27, which would constitute the left hand portion of FIG. 1. In the console portion of the test stand is a computer 28 having provisions for operation with cassette memory 29. The computer has connected to it a remote terminal 30 for reports indicating the results of the tests performed by the stand 25, and calibration of the stand itself.

Figure 2:
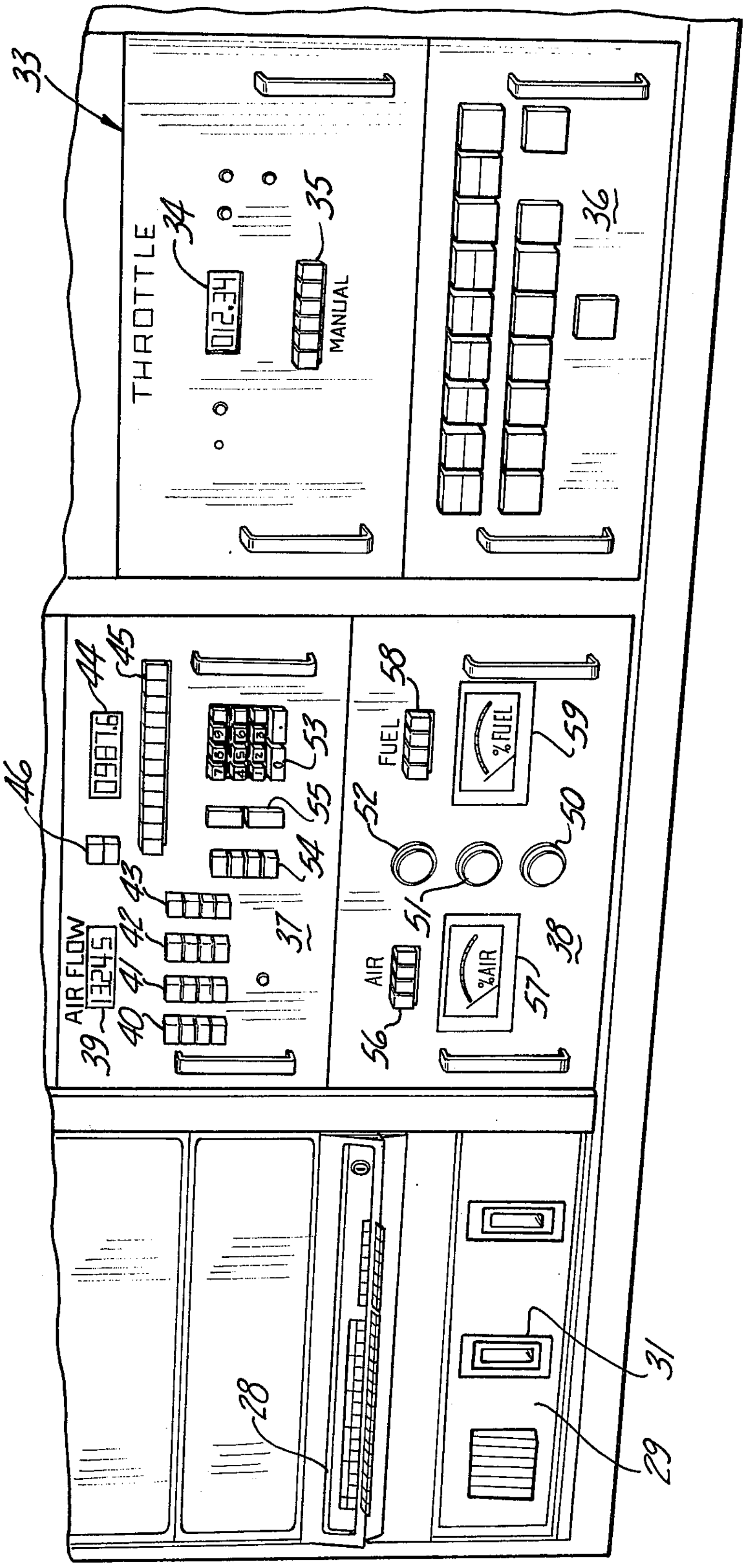
FIG. 2 is a partial cut-away view of the test stand shown in FIG. 1 with the control panel thereof shown on a larger scale.

Also in the console section of the test stand, as shown in the enlarged cut-away view in FIG. 2, is apparatus as generally designated by the numeral 33 for controlling the position of the carburetor throttle during the test. Such apparatus includes a display 34 for displaying the angular position of the throttle, and also a set of push buttons 35 for use when manual control of the carburetor throttle is desired. Below the carburetor throttle control apparatus 33 is a second control panel, generally designated by the numeral 36, which has a series of push button switches which control the supplying of power to subsystems such as the vacuum system, fuel system, the power to the carburetor, etc.

Also mounted in the console section 27 of the stand 25 are other control panels generally designated by the numerals 37 and 38. The upper control panel 37 has several portions, among them a dedicated display 39 upon which will appear the value for air flow at any given time, and four sets of push buttons as identified by the numerals 40–43. The first set of push buttons 40 determines whether the carburetor throttle is to be manually operated by the push buttons 35, or is to be computer controlled.

The second set of push buttons 41 determines whether the manifold vacuum in the stand is to be controlled by the computer, or manually by the potentiometers 50 and 51 which are used to set the manifold vacuum and manifold vacuum bypass valve respectively.

The third set of push buttons 42 is used to determine whether the hood pressure is controlled automatically by the computer 28, or manually by the hood pressure potentiometer 52.

The fourth set of push buttons 43 is used to determine whether the operating mode of the test stand is manual, computer-manual, computer, or calibration.

To complete the description of the upper control panel 37, there appears thereon a generalized display 44 which is adapted to display whatever function is chosen by the display function switches 45 and 46. Below the display function switch 45 appears a keyboard 53 which, together with the associated buttons 54 and 55 provides for the test stand operator to enter the desired test parameters into the computer 28.

Moving on now to the lower control panel 38, in addition to the items previously described, the air flow control buttons 56 select whether the air flow will be computer controlled or manually controlled by the operator, and the associated percent air flow meter 57 informs the operator what percent of maximum air flow the test stand is operating at.

A similar set of controls is provided for fuel flow by the fuel flow buttons 58, enabling the operator to choose whether the fuel flow control is computer controlled or manually controlled by the operator. The associated percent fuel flow meter 59 informs the operator what percent of the maximum fuel flow is occurring at any given time.

Again referring to FIG. 1, to complete the console portion 27 of the test stand 25, there is supplied a hood pressure gauge 60 to inform the operator on a continuous basis what the absolute pressure is under the hood 68. A fuel pressure regulator 62 and a fuel pressure gauge 61 combine to enable the test stand operator to regulate the fuel pressure at the carburetor at all times, while for convenience of the operator when changing carburetors, a manual manifold vacuum shut-off valve 63 enables him to change carburetors without continuously shutting off the vaccum pump (not shown).

On the flow stand portion 26 of the test stand 25 there appears a hood 68 reciprocally movable in a vertical direction by means of the hydraulic cylinders 69. The hood 68, which is adapted to enclose a suitable test chamber 88 in the lowered position has a glass section 70 to enable the operator to look into the test chamber when the carburetor test is taking place. The hood 68 in its lowered position sealingly engages the plate 71 to define a suitable test area thereunder.

Figure 3:
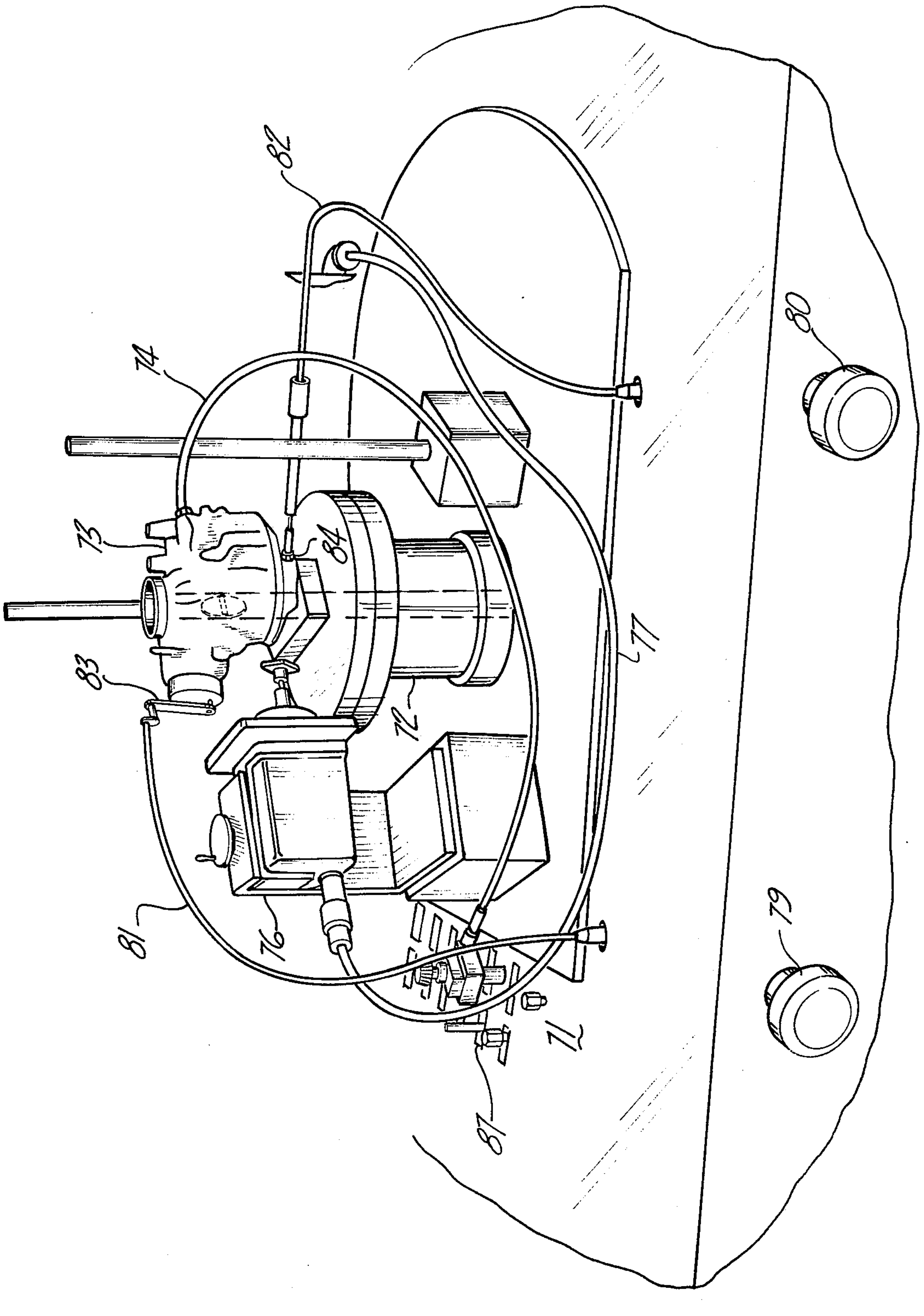
FIG. 3 is a perspective view of the area under the hood of the test stand of FIG. 1, showing a carburetor mounted in the test stand for the purposes of testing and adjusting thereof.

Referring now to FIG. 3, in the test chamber 88, defined by the hood 68 and plate 71, is mounted a riser 72 on which is mounted a carburetor 73 to be tested. Fuel enters the carburetor 73 by way of the fuel line 74, which is output of the fuel flow measurement system shown in FIGS. 4, 5, 15 and 16. Connected to the carburetor 73 is a carburetor throttle positioner 76 connected to a power source with an appropriate electric wire 77.

If the purpose of a particular test being run is only to determine what a certain carburetor will flow as is, no adjustments of components such as the idle screw 84 or choke plate linkage 83 is needed. However, if it is desired during the laboratory test to set a carburetor to a certain point, this can be done to various components of the carburetor without lifting the hood 68 such as by means of the choke plate control knob 79 which sealingly communicates with the test chamber 88 by way of the choke linkage 83. Thus, turning the knob 79 rotates the linkage 83.

Similarly, turning the idle screw control knob 80 causes the cable 82 to rotate the idle screw 84. Other adjustment means can be similarly provided depending on the requirements of the test being run. If desired, adjustments such as these could be done using electrical motors which could be controlled by apparatus on the control panel such as designated by the numeral 33 for controlling the carburetor throttle plate position.

Also in the flow section 26 of the test system 25 there appears a bank of manometer tubes designated by the numeral 86 which are for the operators use and may be connected to the interior of the test chamber by means of bulkhead connections 87.

Figure 4:
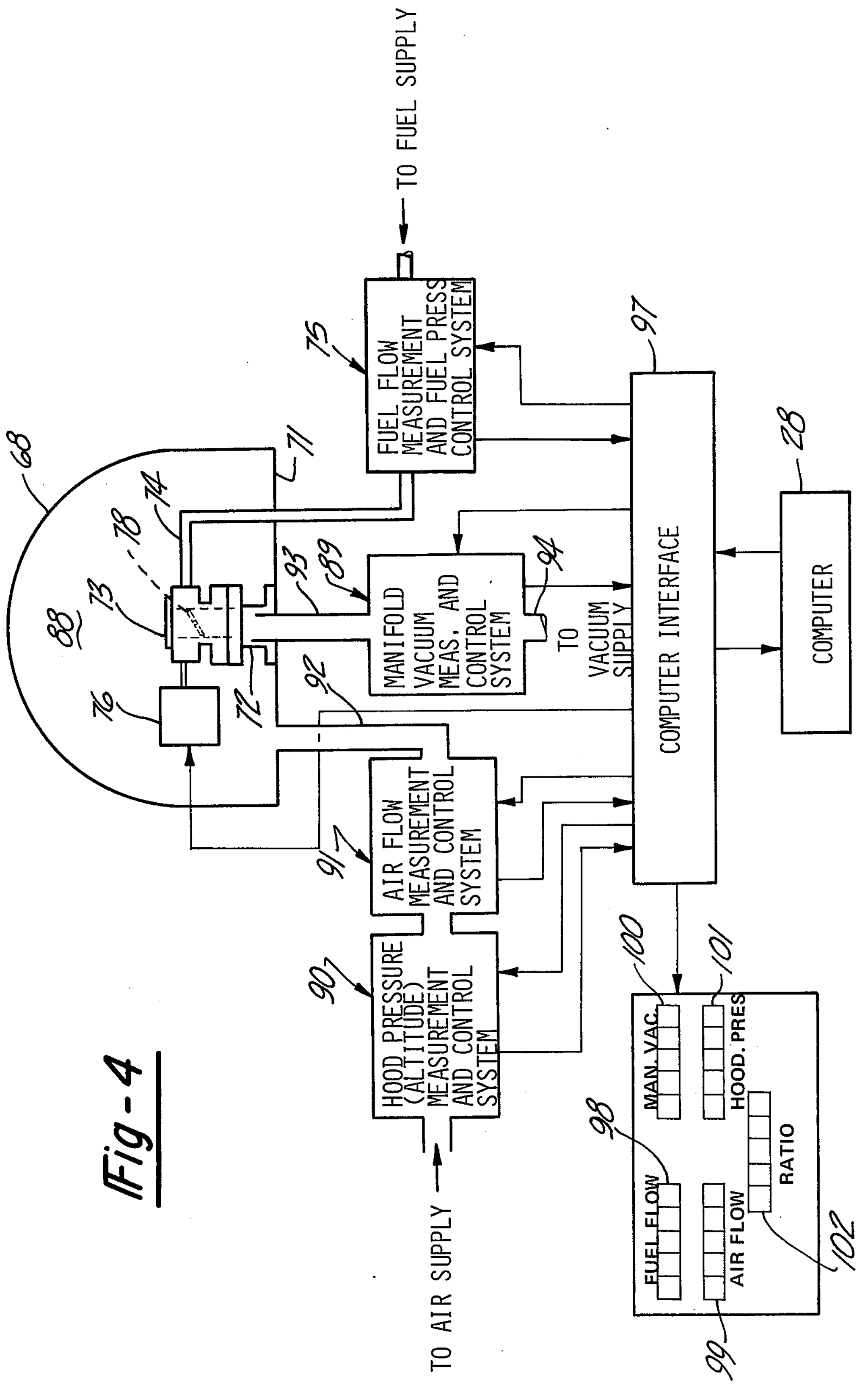
FIG. 4 is an overall diagrammatic view of a test system embodying the construction of the present invention and showing as subsystems thereof systems to control the hood pressure, air flow, manifold vacuum, and fuel flow.

A basic system embodying the construction of the present invention is shown in FIG. 4. In operation, the carburetor 73 would be mounted under hood 68, in the manner previously described, to the riser 72. The hood 68 would then be lowered to sealingly enclose the test chamber indicated by the numeral 88. The next step in a carburetor test utilizing the present invention is to cause the manifold vacuum measurement and control system 89 to cause air to flow from the air supply (controlled room or supply system) through the hood pressure measurement and control system generally designated by the numeral 90, through the air flow measurement and control system generally designated by the numeral 91, and through the conduit 92 to the interior of the test chamber 88. From here, the air flows through the carburetor 73, the conduit 93, through manifold vacuum measurement and control system 89 by means of the conduit 94 to a vacuum source (not shown), and ultimately to the atmosphere. Air flowing through the carburetor 73 draws fuel into the carburetor from the fuel line 74 which is connected to the fuel flow measurement system 75. This, in turn, is connected to the fuel supply (not shown).

In regard to the vacuum source, it is not felt that it need be described in detail, as the vacuum source is normally a vacuum pump of which there are many on the market.

Any vacuum pump may be used providing that it is of size sufficient to produce the air flow necessary through the carburetor being tested so that all desired tests can be run.

Similarly, the air supply system need only be a source of air which is being controlled as to temperature, pressure, and humidity. Many air supply systems are available, and again, any supply system may be used, provided it is of a sufficient capacity to flow the desired amount of air through the carburetor being tested so that such carburetor may be tested under all desired conditions.

In regard to the fuel supply system, this is essentially a fuel pump which can supply fuel at a desired pressure and temperature in sufficient volume so that the particular carburetor being tested can be run at any point of its operating range. Again, any of several such fuel supply systems may be used.

To proceed with the details of the carburetor test, the manifold vacuum measurement and control system 89 has caused air to flow through the carburetor 73. In normal carburetor tests, it is desired that the pressure under the hood 68 be set at sea level by the hood pressure system 90, and kept constant at all test points. In performing a carburetor test in the laboratory, since subsonic flow is used, one must, for each flow point at which it is desired to test the carburetor, arrive at a predetermined air flow at a certain manifold vacuum and hood pressure. After the air flow is established, the air flow measurement and control system will cause the throttle plate in the carburetor to be rotated by the throttle positioner 76 until the desired air flow is present through the carburetor. At this point then you have achieved a given air flow at a predetermined manifold vacuum and hood pressure. Having achieved the desired flow through the carburetor, one is in a position to know the mass flow rate through the carburetor, and if one now measures the mass fuel flow rate entering the carburetor, the air/fuel ratio of the particular carburetor at the predetermined test point can be determined. The mass fuel flow rate of the fuel entering the carburetor is supplied by the fuel flow measurement system 75.

As previously desired, it should be understood that the method for testing carburetors which has been described until this point is only one of three possible types of carburetor tests which can be performed, all of which are known in the art. The test just described involved testing the carburetor at a specific manifold vacuum, air flow, and hood pressure and determining the mass air flow rate and mass fuel flow rate at this specific point to arrive at an air/fuel ratio. There is also what is known as a "Balanced Box" carburetor test in which, at all positions other than idle and wide open throttle, the manifold vacuum present is a function of the characteristics of the vacuum pump. At other than idle or wide open throttle such a test results in very little flexibility because one must accept the values of manifold vacuum which one gets as a result of the characteristics of the pump, and these may or may not be where you desired to test.

The third type of carburetor test that I am aware of would be the constant manifold vacuum test, in which one would flow at a single manifold vacuum for all test points, with the only flexibility being the different throttle positions. I wish to make it clear that I am not claiming any of these types of carburetor tests as my invention, but instead have developed a new system of carburetor testing which overcomes the controller and other problems to be discussed below in which the use of a computer interface 97 and the computer 28 can arrive at the desired conditions for any given test point much more quickly than was previously possible, and which as an added benefit of the use of the computer can give direct read outs of fuel flow 98, air flow 99, manifold vacuum 100, hood pressure 101, and air/fuel ratio 102.

Figure 5:
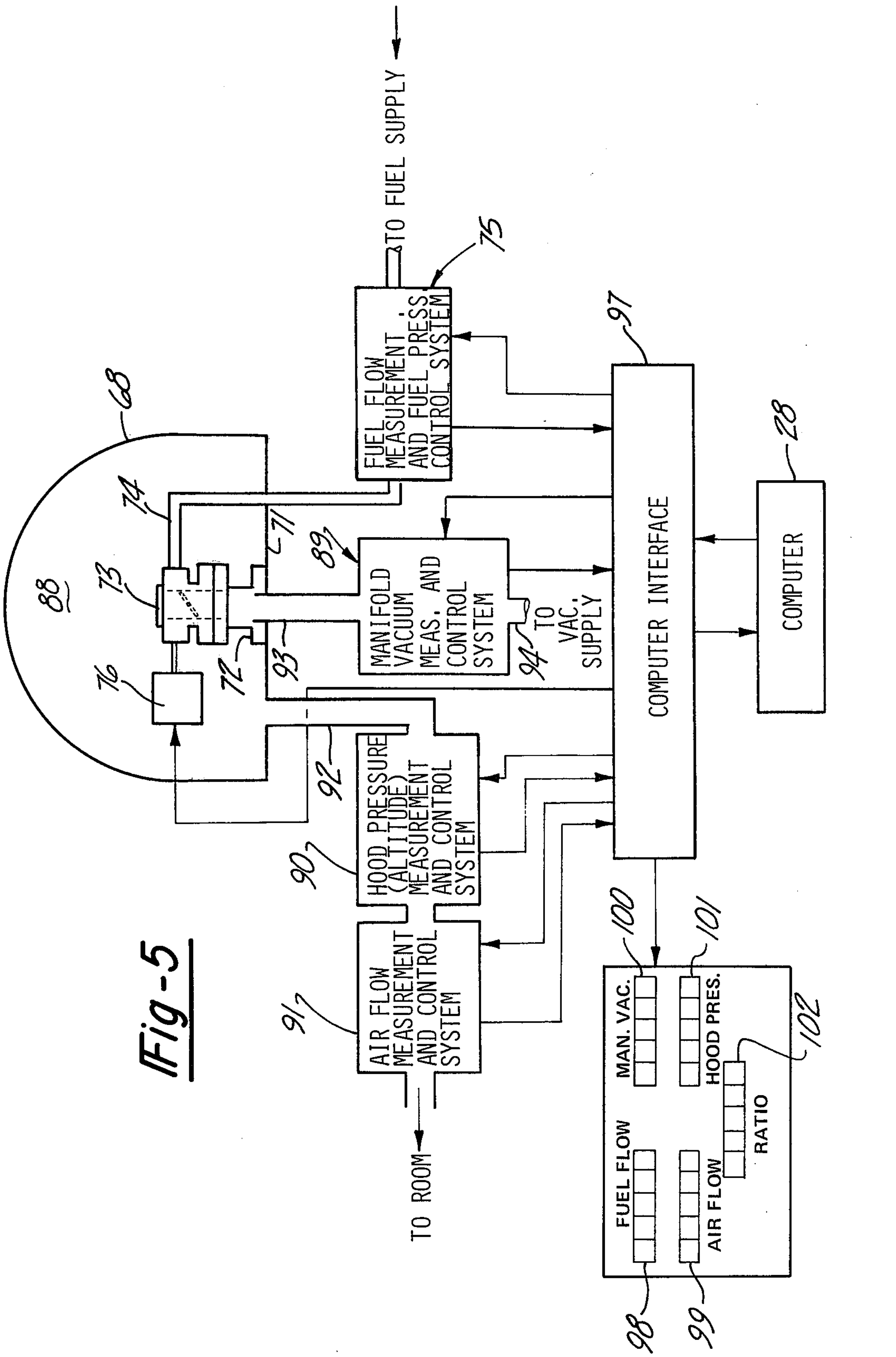
FIG. 5 is a diagrammatic view of a system substantially similar to that shown in FIG. 4, but being intended for use in a room where the environment is controlled to produce the desired test conditions.

Also the system of the present invention is adapted to be used both in a system as shown in FIG. 4, where an air supply system is available to supply air at a desired pressure, air temperature and humidity, or as shown in FIG. 5, where the system is adapted to be used in a controlled environment room where the same parameters of air pressure, temperature and humidity are controlled.

Figure 6:
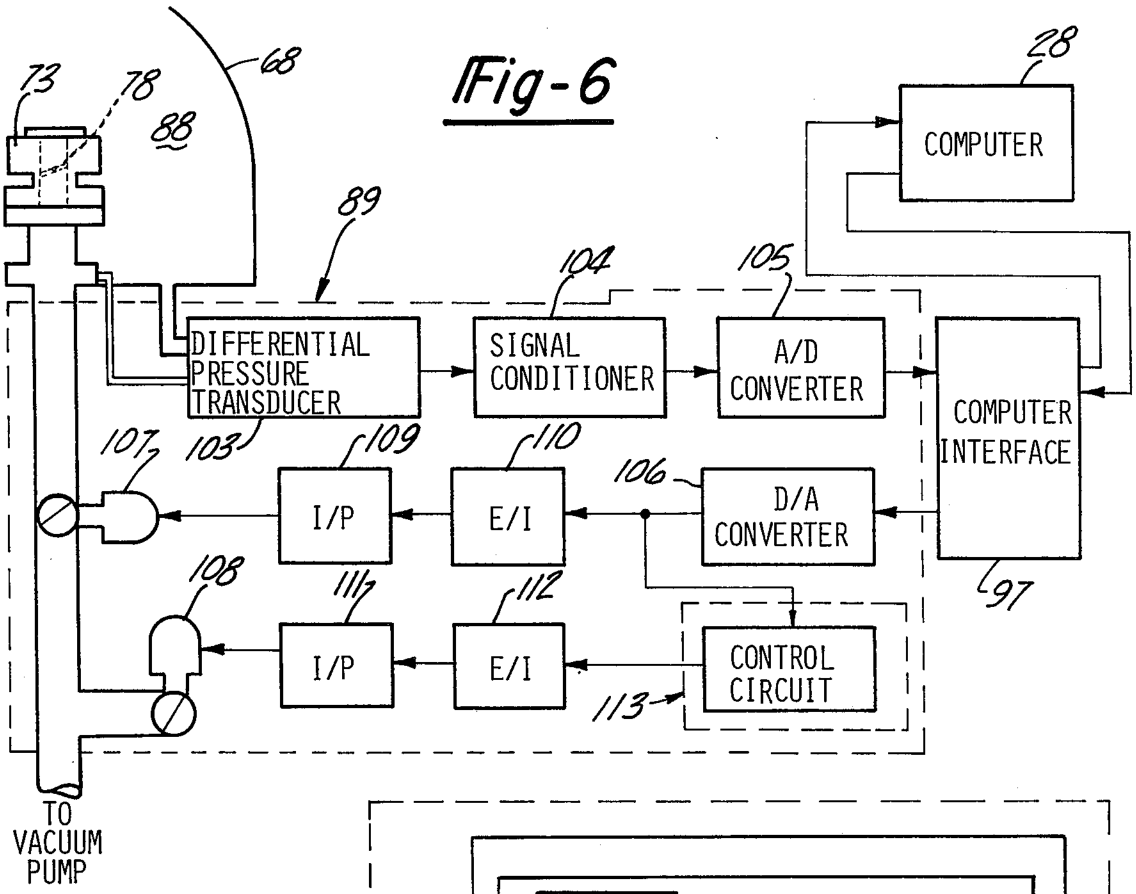
FIG. 6 is a diagrammatic view showing the manifold vacuum measurement and control system as it may be used in FIGS. 4 or 5.
Figure 9:
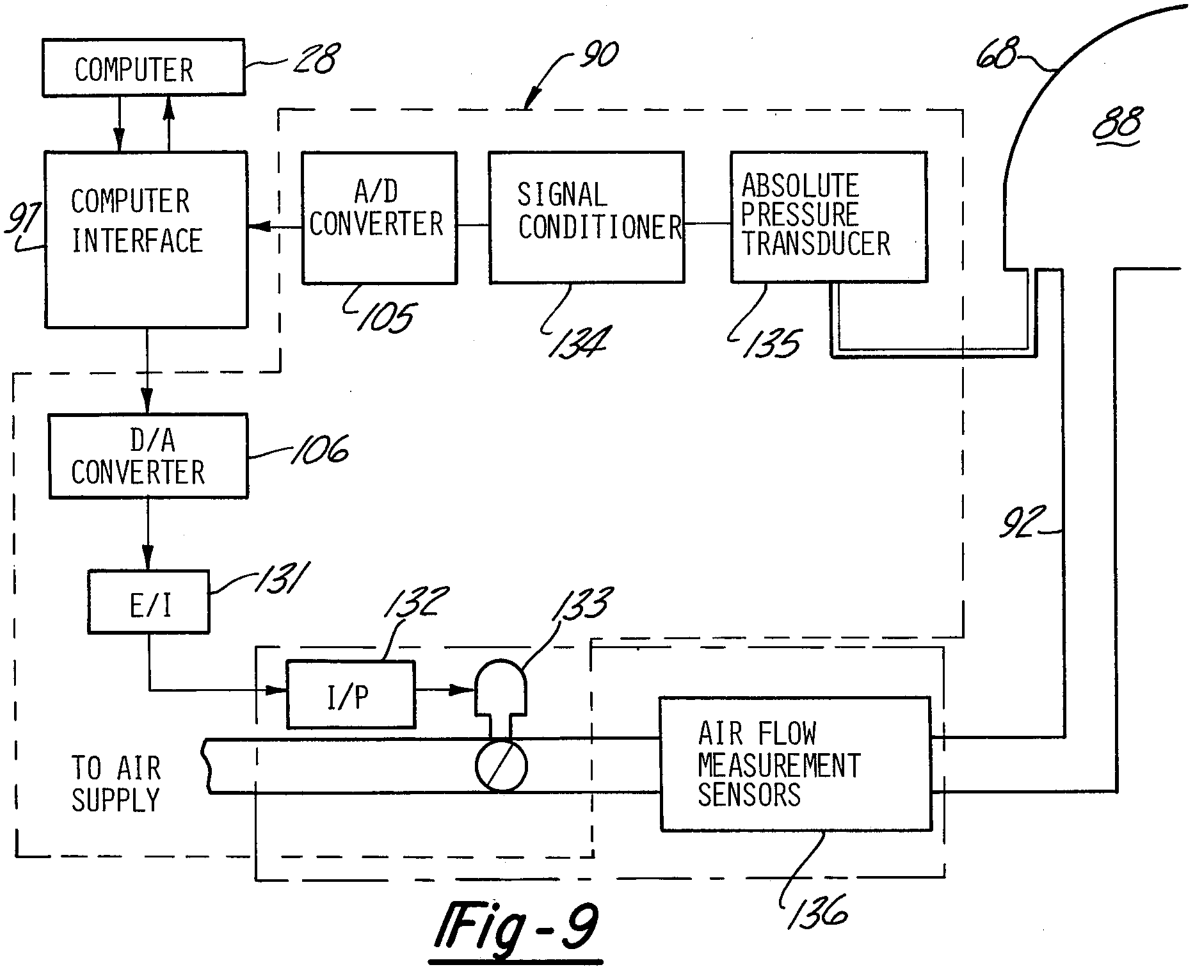
FIG. 9 is a diagrammatic view of the hood pressure control system as it may appear in the construction of FIG. 4.

Before describing in detail the manifold vacuum measurement and control system 89, shown in detail in FIG. 6, the hood pressure measurement and control system 90, shown in detail in FIG. 9, and the air flow measurement and control system 91, shown in detail in FIG. 11, a brief review of the definitions and effects of the rate, reset and proportional control is felt essential to the understanding of the present invention.

Basically, proportional control is one in which there is a continuous linear relation between the value of the controlled variable, in this case air flow, and the position of the final control element, which in this case would be the valve. Proportional control action operates the controller according to what is called a proportional band and this band expressed in percentage is the range of values of the control variable which corresponds to the full operating range of the valve. For example if a 50% change in the air flow would cause the valve to go from a fully closed position to a fully open position it is said that there is a 50% proportional band. In processes which are easy to control a proportional control is sufficient, but the proportional band must be chosen carefully.

Referring to FIG. 19, it is desired to keep a certain value constant and there is an upset of the system, FIG. 19 shows the importance of choosing the correct proportional band. After the system experiences an upset, the system will cycle as shown by the curve labeled A if too low a proportional band is chosen. If too high a proportional band is chosen you will have a large and prolonged deviation from your desired value or set point, as shown by the curved labeled C in FIG. 19, while with the correct value, as shown by the curve labeled B, you will have the quickest return to the set point after the system experiences an upset.

Also with proportional control, for instance in a temperature control system, there is a temperature corresponding to each position of the control valve. The process will stabilize at any temperature within the proportional band. As shown in FIG. 27, with a proportional band of 10% the valve is open at 45% of the measurement span and closed at 55%. The process can stablilze at any temperature between these limits and this results in a problem called offset, as the system can stabilize at a value several degrees different than the original temperature.

Especially with processes that are difficult to control and require a wide proportional band, the effect can be undesirable. The curves in FIG. 22 correspond to those in FIG. 19, and with a too wide a proportional band, indicated by the letter C, offset can be substantial. Such processes require the adding of a reset type of control, as it is necessary to utilize a function which will allow the controller to hold the variable at a set value instead of at a zone. Such a proportional-plus-reset controller is termed a "Two-mode Controller".

The effect of reset control alone is shown in FIG. 20, again with curves A, B and C showing the effects of too low, correct or too high a reset time respectively. The proportional plus reset control curves are shown in FIG. 23, and it can be seen that eventually, whether the reset time is too short, represented by the curve labeled X, too long, represented by the curve labeled Z, or the correct, represented by the curve labeled Y, the effect is offset is eliminated.

In extremely difficult control situations, the proportional-plus-reset controllers may well be too slow, and in such cases the derivative or rate control actions are added to achieve the shortest possible recovery time. Proportional plus reset plus derivative controllers are often termed "Three-mode Controllers" and are the type used in the present invention.

Derivative control action is proportional to the rate of change of measurement and causes the control valve to reach a correct position sooner than with a Two-mode Controller. In essence the addition of the derivative control action helps the system to anticipate changes. The effect of derivative action alone is shown in FIG. 21, again with the causes labeled A, B and C representing the effect of a too low, correct, or too high derivative time.

The proportional plus reset plus derivative curves are shown in FIG. 24, which provides the fastest possible recovery time. For the Three-mode Controller, the choice of the proper derivative time is critical, because the choice of a too long derivative time, represented by the curve labeled X, will again cause the system to cycle. The choice of too short a time, represented by the curve labeled Z, will cause too large a deviation from the set point, while the curve labeled Y will have the optimum response time.

The difference in time between the system with proportional and reset control only, and porportional and reset control with derivative action is dramatically illustrated by FIGS. 25 and 26. The recovery time for a Two-mode Controller is represented by the recovery curve labeled "proportional and reset" in FIG. 25, and the recovery time is represented by T2, while the recovery time of a Three-mode Controller is represented by the "proportional, reset and derivative" curve, and the recovery time is represented by T3. It can be seen that T3 is approximately one-half of T2. For better comparison, these curves are superimposed in FIG. 26.

It is not felt that any additional discussion of the type of control actions available is needed, as this informationn is readily available to one skilled in the art of control systems. If further information in this field is desired, several fine reference materials are avialable, among them is an article entitled *Basic Control Modes* appearing in the Oct. 20, 1969 issue of Chemical Engineering on pages 115–119 by L. M. Soule of the Foxboro Co. Another fine paper on this subject is a lecture entitled *Principles of Automatic Control* delivered by Malcolm B. Hall of the Foxboro Co., presented at the Process Instrumentation Course of the Canadian Pulp and Paper Association. Also, several technical papers have been published by the Foxboro Co. of Foxboro, Massachusetts, a leading manufacturer of two and three-mode types of controllers. Among the most helpful of these bulletins are the Technical Information Series bulletins TI 3-1*a*, TI 3-10*a* and 11-454. Also chapters, 1, 2, 11, and 12 in the book entitled *Instrumentation for Process Measurement and Control* by Norman A. Anderson, published by the Chilton Co. 1972, would be most helpful to anyone seeking further understanding of the system controlling art.

Without discussing basic types of control any further, what is obvious from the above is the critical need for having not only the right type of controller for a process to obtain maximum efficiency, which in this case is a Three-Mode Controller but also the need for the optimum value of rate, reset and proportional band for each test point to avoid cycling of the system or too great a deviation from the set point you are trying to maintain, both of which greatly increase the time necessarily to stabilize the system after an upset. It is the capacity to supply the proper values for rate, reset, and proportion at each carburetor test point which has enabled the system of the present invention to solve a great and long standing problem in the carburetor testing art.

Now having an understanding of what the present invention has achieved, a detailed description of the various systems used in a laboratory carburetor testing system embodying the construction of the present invention may be had.

Referring to FIG. 6, and remembering that the manifold vacuum can be defined as the pressure across the carburetor, and is usually measured as the differential pressure between two points, the first being at a point inside the test chamber 88, and the second at a point in the carburetor riser 72, this measurement is performed by differential pressure transducer 103. The signal from the differential pressure transducer 103, which is normally a current signal, is supplid to the signal conditioner 104 where it is continuously converted into a voltage signal which is then supplied to an A/D (analog-to-digital) converter 105 where it is converted into a digital signal, which is supplied to the computer interface 97, and from there is transferred to the computer 28.

It should be understood at this point that although the description of the manifold vacuum measurement and control system, the hood pressure control system and the air flow system all show a computer interface 97, A/D converter 105, and D/A converters 106, and these are being illustrated separately for ease of understanding, in practice all the A/D converters illustrated may be replaced by a single converter, as may all the computer interfaces and the A/D converters, with such replacement being of a multiplexing type. It should also be understood that although these systems all show a computer illustrated separately for ease of understanding, in practice these may be replaced by a single computer. It is also to be understood that it is in the realm of possibility that there may be some application in which separate computer, computer interface, A/D converters and/or D/A converters may be desirable, and this is well within the scope of my invention.

To continue with the description of the manifold vacuum control system 89, the signal that the computer 28 has received can now be used for the calculation of the actual manifold vacuum. In establishing manifold vacuum, it is customary to use two valves, one being the manifold vacuum in-line valve 107 and the other being the manifold vacuum bypass valve 108. The bypass valve is generally used to establish the maximum vacuum which can be obtained, while the manifold vacuum in-line valve is used to adjust the manifold vacuum to the one vacuum required. The computer uses the value of the manifold vacuum as previously calculated in determining the desired position of the manifold vacuum in-line valve 107. The computer then supplies a signal to the computer interface 97, which in turn supplies this signal to the D/A convertor 106. From the D/A converter the voltage signal is supplied to the E/I transmitter 110 which converts this signal into a current signal which is fed to the I/P transmitter 109. The pressure signal from this transmitter is supplied to a positioner which is a part of the manifold vacuum in-line valve 107. The position of this valve is directly controlled by the signal which is supplied to the positioner. As an example, when a signal of three PSI is supplied to the positioner the valve is fully open, while a pressure of 15 PSI results in the valve being fully closed.

Figure 18:
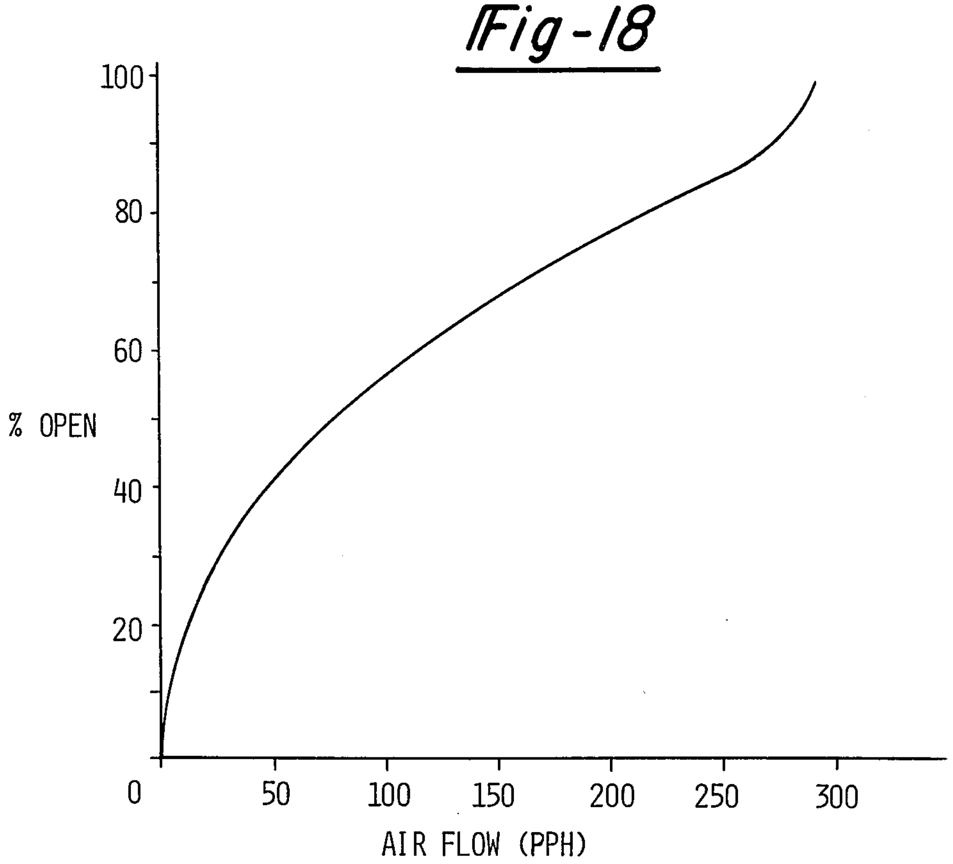
FIG. 18 is a graph showing the relationship between the percentage opening of a valve and the air flow through the valve.

It is desirable that this valve be used in the center operating area normally between approximately 20% open and 90% open. Referring to FIG. 18 it is seen that if the valve is used at less than 20% open, small changes in the pressure signal from the I/P transmitter 109, corresponding to small changes in the valve opening, result in small manifold vacuum changes which are large percentage changes thus resulting in a manifold vacuum signal which is not stable. If the valve is used at a position greater than 90% open, changes to the pressure signal supplied to the positioner have little effect on the manifold vacuum, and thus the response is extremely slow. For this reason we use the manifold vacuum bypass valve 108 as an adjustment to keep the manifold vacuum in-line valve 107 operating in the desired range. To accomplish this, the voltage signal from the first manifold vacuum D/A converter 106 is also supplied to the control circuit 113. The output of the control circuit is an analog voltage signal which is supplied to the second manifold vacuum E/I transmitter 112, which converts the voltage into a current signal which is then supplied to the second manifold vacuum I/P transmitter 111. The pressure output from this transmitter is supplied to the positioner which is a part of the manifold vacuum bypass valve 108.

It should be understood that when the I/P transmitter is used, what is meant is a current to pressure converter. This item need not be discussed in detail because it is well known in the art, and a I/P transmitter that may be used in the present invention is the Model No. 69TA made by the Foxboro Company, Foxboro, Massachusetts.

Similarly when the term E/I transmitter is used, what is meant is a voltage to current converter, which also may be one manufactured by the Foxboro Company, such as their Model No. 66G. These I/P and E/I transmitters will be shown in many places throughout the description of the various figures of the drawings. However, in the case of these two transmitters, unlike the A/D and D/A converters, a separate transmitter is needed wherever shown, as unlike the D/A converter, wherein the converter may be of a multiplexing type, such a substitution is not possible in this case, and although all the I/P and E/I transmitters illustrated may be identical, they will carry separate numbers as physically separate transmitters are needed. The same holds true of the signal conditioners.

The A/D multiplexing type of converter is possible in this test stand because the computer operates at such a rapid speed that it is able to sense the signals of the various signal conditioners at such a rapid rate that no error is caused. In the signal supplied to the I/P convertr it is required that a pressure be available to the valve positioner all of the time or else the valve position will change causing errors in the stand operation.

Figure 7:
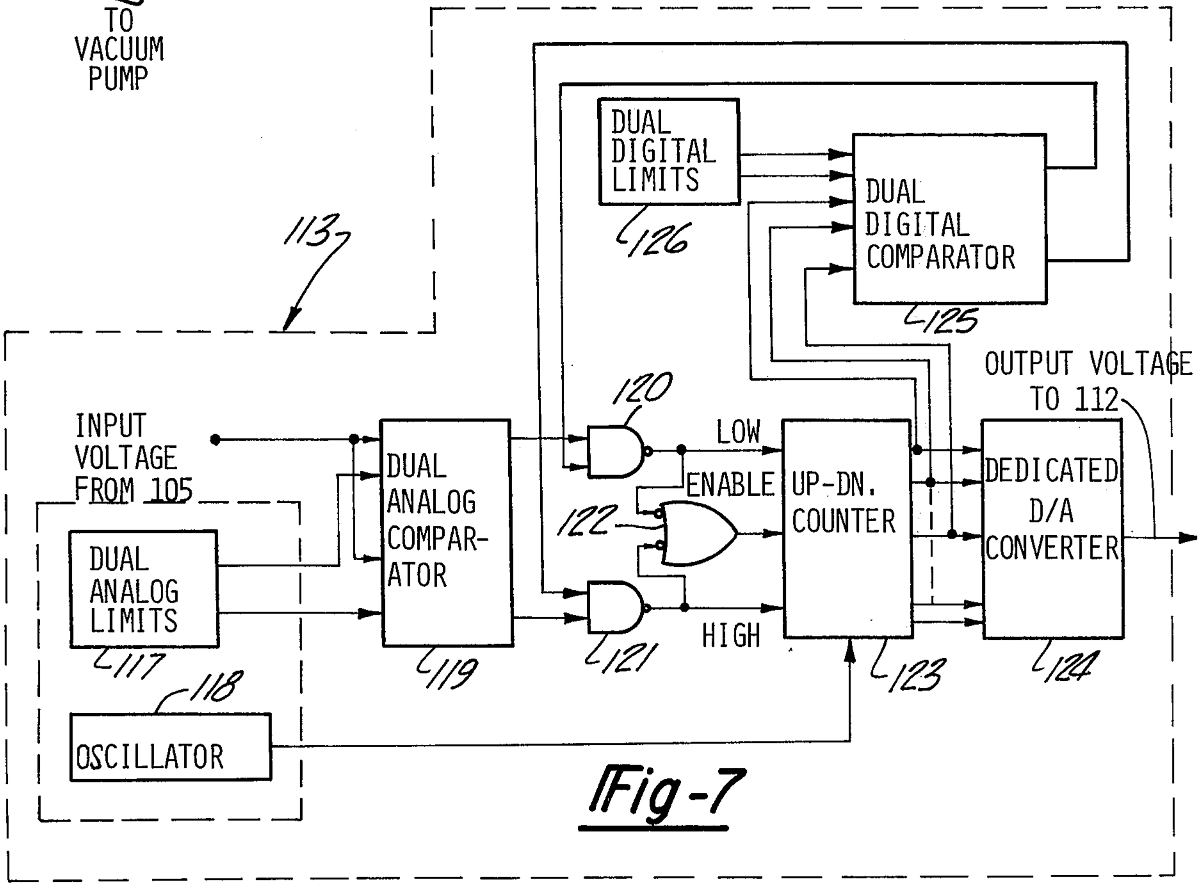
FIG. 7 is a diagrammatic view of the control circuit enclosed in the dotted lines in FIG. 6.

The control circuit 113 is shown in more detail in FIG. 7. Voltage signals from the dual analog limits 117, such as can be provided by potentiometers manufactured as Model No. 7216 by Beckman Instruments, Inc. of Fullerton, California, are supplied to the dual analog comparator 119. It should be understood that the dual limits represent the desired working range of the manifold vacuum in-line valve 107. As described previously, these limits might be for example between 20% and 90% open. It should be recognizd that at the different conditions over which air flow is measured, it might be desirable to have a different set of dual limits for each air flow measurement sensor, in which case the limits provided to the dual comparator would be set for the particular air flow range in use. The voltage signal from the first manifold vacuum D/A converter 106 is also supplied to the dual comparator 119. If the input voltage is within the desired working range, then both outputs from the dual comparator are at a low TTL (transistor-transistor logic) level. If the input voltage is at a level indicating that the valve position is not sufficiently open a high TTL output is supplied to the first NAND gage 120. The output of the NAND gate is a low level TTL signal which is supplied to the up-down counter 123, such as Model No. 30015, manufactured by Scans Associates, Inc., Livonia, Michigan. The low level signal from the first NAND gate 120 is also supplied to the third NAND gate 122, which functions as an OR gate, in supplying a high level enable signal to the up-down counter. The up-down counter then utilizes the pulses which are provided by the oscillator 118 and proceeds to count in an increasing direction. It should be recognized that, as with the dual limits, it might be desirable to have a different oscillator frequency for each air flow measurement sensor. The output of the up-down counter is a binary TTL logic level signal which is supplied to a dedicated D/A converter 124. As the count on the counter increases, the analog output voltage to the dedicated D/A converter increases also, which in turn increases the pressure supplied to the manifold vacuum bypass valve 108, which causes the valve to change position.

When this valve position changes, the manifold vacuum signal, as sensed by the differential pressure transducer 103, causes the manifold vacuum to change. This change in vacuum is supplied to the computer 28 as described above. As shown in FIG. 6, the computer senses the change in manifold vacuum and provides a different output signal which changes the pressure supplied to the manifold vacuum in-line valve 107 until the valve is in the desired range. At this time, the analog signal from the first manifold vacuum D/A converter 106, which is supplied to the dual comparator 119, is within limits, and the output signal of the comparator again becomes a low TTL signal. This in turn changes the output from the first and second NAND gates, 120 and 122 respectively, causing the up-down counter 123 to stop counting.

Similarly, if the analog voltage supplied to the dual comparator 119 was such that the in-line valve position exceeded the other limits, a high level output signal would be supplied to the third NAND gate 122 and would cause the up-down counter 123 to count in the opposite direction and change the output of the dedicated D/A converter 124, causing the manifold vacuum bypass valve 108 to change its position until the manifold in-line valve 107 was once again in the desired operating range. In order to insure that the manifold vacuum bypass valve 108 does not exceed its proper opening, a set of dual digital limits 126 is also provided for checking the output of the up-down counter 123. The dual limits 126 are both supplied to the dual digital comparator 125. If the valve is operating outside its limits, the output signal from the dual digital comparator becomes a low TTL signal, causing the NAND gates, 120 or 122 to have a high output signal, in turn causing the up-down counter 123 to stop further counting in that direction. This in turn causes the analog voltage to the dedicated D/A converter 124 to remain constant, which prevents further movement of the valve 108 in the same direction.

Figure 8:
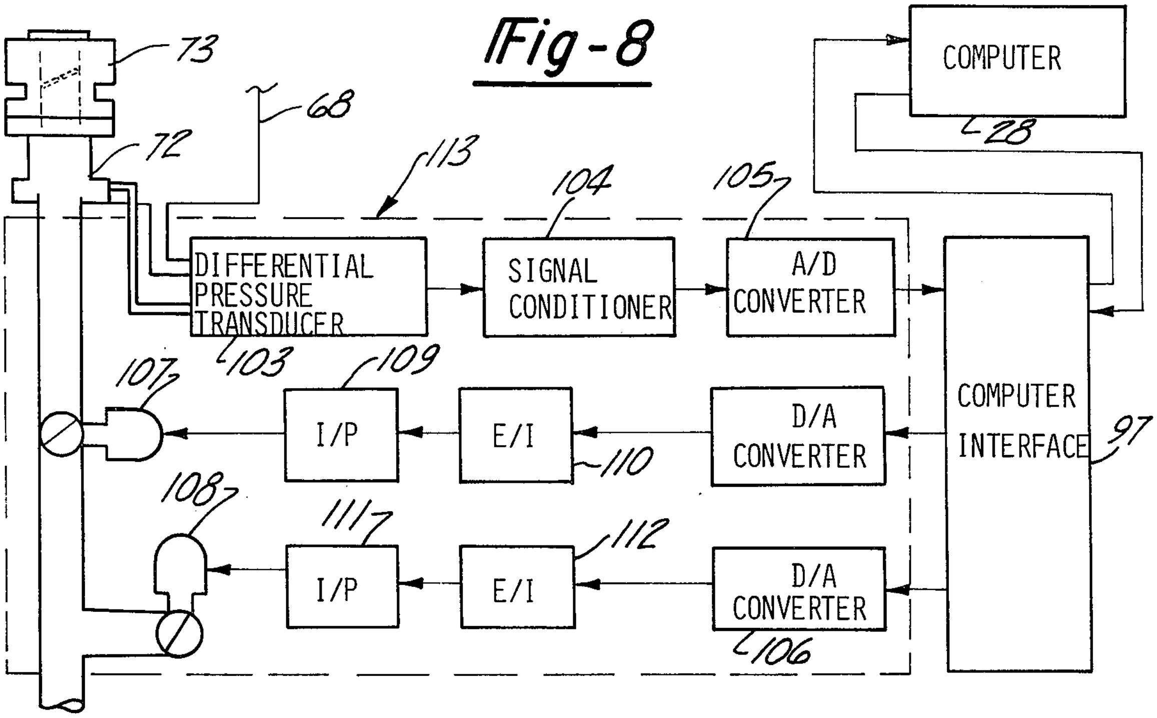
FIG. 8 is a view substantially similar to that of FIG. 6 wherein the manifold vacuum bypass valve is adapted for computer operation.

In FIG. 8, the manifold vacuum is substantially controlled in a similar manner as that shown in FIG. 6, except that the manifold vacuum bypass valve 108 is also controlled by the computer. The computer 28 provides an output signal to the computer interface 97, which in turn provides a signal to a second section of the manifold vacuum D/A converter 106. The output of this D A converter is a voltage signal which is supplied to the second manifold vacuum E/I converter 112, and the current from this converter is used as described previously. In this case, additional computer interface hardware and computer programming is required to make the system operate substantially the same as previously described. Through the use of computer, operation of the manifold bypass valve as shown in FIG. 8 is achieved.

The hood pressure measurement and control system 90 is shown in more detail in FIG. 9. This system is used in controlling the pressure in the test chamber 88. When this pressure is less than ambient pressure, it is sometimes referred to as altitude. The pressure in this chamber is sensed by an absolute pressure transducer 135 such as Model No. 1105, manufactured by Rosemount Engineering Co. of Minneapolis, Minnesota. The output of this transmitter is a voltage signal which is supplied to a hood pressure signal conditioner 134, whose output in turn is supplied to the hood presure A/D converter 105. The digital output of this converter is sent to the computer interface 97, and then to the computer 28.

Figure 10:
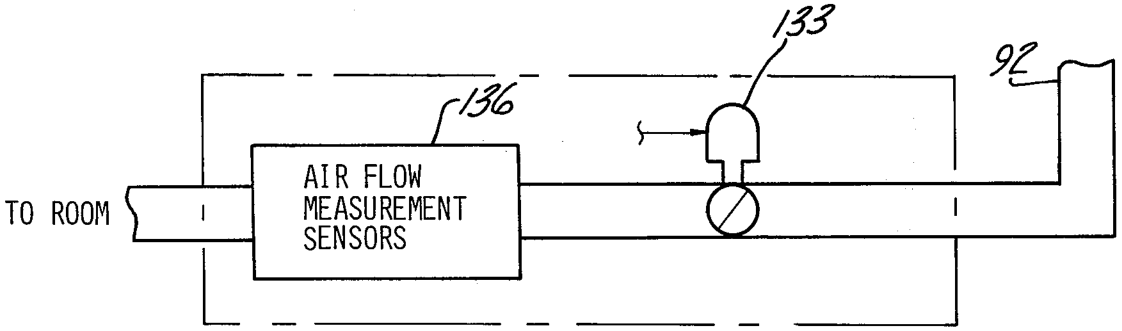
FIG. 10 is a partial view showing the changes needed in the construction shown in FIG. 9 for the hood pressure control system to be used in the apparatus shown in FIG. 5.

The computer utilizes this signal in calculating the value of the hood pressure. Hood pressure is controlled by the operation of the hood pressure valve 133. The position of the valve is controlled by the computer 28 which provides a signal based on the optimum value of rate, reset and proportion for the particular test point to the computer interface 97 which in turn provides a digital signal to the hood pressure D/A converter 106. The voltage output of this converter is sent to the hood pressure E/I transmitter 131 to convert this voltage to a current that is supplied to the hood pressure I/P transmitter 132. The air pressure supplied from the I/P transmitter is supplied to the positioner which is a portion of the hood pressure valve 133. The valve 133 sets the hood pressure in a manner similar to that just described for the manifold vacuum valve 107. The operation of the system as shown in FIG. 10 is substantially the same. In this case the hood pressure valve 133 and air flow measurement sensors 136 are reversed when used in a controlled environment room.

In the test equipment which has been provided prior to this invention, a controller such as Model 62-H manufactured by the Foxboro Company of Foxboro, Massachusetts is used in conjunction with pressure transmitters, the signal conditioners, the I/P transmitters, and the hood pressure and manifold vacuum in-line valves. One controller is used for manifold vacuum in-line valve control and a second controller for the hood pressure valve control. These controllers are of a type frequently used for control of valves and include the capability of setting in single values for the three terms proportional, reset, and rate (or derivative). As previously discussed, the amount of proportion that is set is used in determining the factor by which the output signal to the valve changes in proportion the difference between the desired set point and the actual hood pressure or manifold vacuum sensed by the transducer. The reset capability is used to keep shifting the set point gradually and thus force the controller to follow the set point until the desired point has been reached. The rate action is used when its desired to anticipate the process change because the process does not respond rapidly. As previously discussed, for use in a carburetor test stand in the laboratory, there is an optimum setting for each of the three terms proportional, reset, and rate for a given flow test condition which encompasses the required hood pressure, manifold vacuum and air flow. Experience has shown that as one or more of the test conditions changes it may become desirable to change the setting of one or more of the three terms in order to keep optimum test conditions in regard to speed of response, stability of hood pressure, and stability of manifold vacuum.

Determining the optimum setting of the three terms is a very time consuming process making it unfeasible for an operator to continually change these settings while a test is in progress. While it would be possible to design a system that would have the potential for setting the terms proportional, reset, and rate for a varity of test conditions, in reality this is not feasible because the expense of designing a special system would also require detailed analysis of the hood pressure, manifold vacuum, and air flow conditions in order to determine the desired setting each of the three terms. The number of settings that would be required would also need to be determined. In this invention, utilizing the computer 28 I have included a controller type operation which contains the capability of establishing the proportion, reset, and rate settings as a function of the actual and desired value of hood pressure, manifold vacuum, and air flow.

Figure 28:
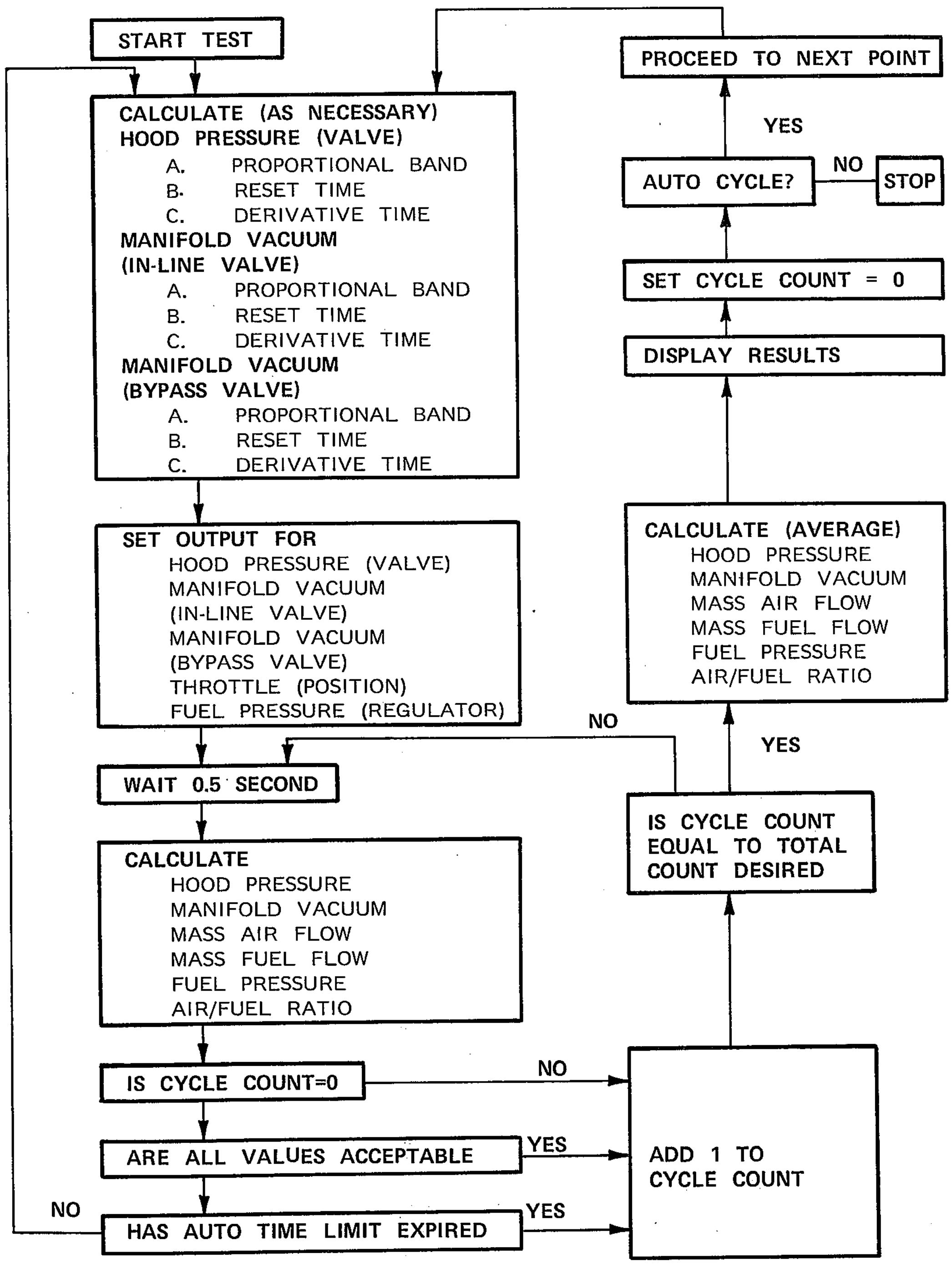
FIG. 28 is a drawing of a flow chart showing one of the methods that a carburetor laboratory test stand embodying the construction of the present invention may use to perform a test at a specific manifold vacuum and hood pressure.

Referring to FIG. 28, which will be described later in greater detail, there is shown a flow chart of how the completely automated carburetor test stand of the present invention may operate. It can be seen that the first step which occurs in the carburetor test is to calculate for the particular test stand the values of proportional band, reset time and derivative time for each of the control valves such as the manifold vacuum in-line valve 107, the manifold bypass valve 108 when this valve is to be operated by the computer, and the hood pressure control valve 133. As mentioned previously, such a calculation could be performed for each test point and be set on a controller which, in turn, would operate the control valve. However, such problems were encountered in trying to perform this step that it became completely unpractical. However, I was not deterred by this fact, and knowing that the formulas were available to calculate these values, and knowing that a computer was available in the system, I have adapted the computer to calculate these values for each test point as part of the overall operation of the test stand and thus, have solved what was previously an insurmountable problem in the art.

The formulas which the computer uses to arrive at the values can be found in several reference books, such as *Industrial Process Control* by Sheldon G. Lloyd and Gerald D. Anderson, published by Fisher Controls Co., Marshalltown, Iowa, 1971, and need not be described in detail, as they are available to one skilled in the art. However, the mere fact that the formulas were available, as previously mentioned, was not enough, as it was my new combination of using the formulas with the computer operation which solved the problem in the art and which is an important advance in the art.

As can be seen, the above described step is a very important one as it provides the basis for the other operation in the carburetor test which will be described later, after a description of the air flow measurement and control system 91 and the fuel flow measurement system 75.

The air flow measurement and control system 91 is shown in FIG. 11. As the air passes through the laminar flow tubes 143 a differential pressure signal is provided which is proportional to the air flow through the laminar flow tubes. This differential pressure is sensed by the air flow differential pressure transmitter 142, such as Model No. 1151 manufactured by Rosemount Engineering Company which converts this signal into a current signal. The current is supplied to the air flow signal conditioner 139 converting the current into a voltage which is supplied to the air flow A/D converter 105 for conversion into a digital signal, which is supplied to the computer interface 97 and thence on to the computer 28. Since the laminar flow tubes are a volumetric device, and carburetor testing is normally done in mass flow units, it is also necessary that the temperature and absolute pressure of the air entering the flow tubes be known in order to calculate the mass air flow. The temperature is sensed by the temperature transducer 140 such as Model NO. 410 as manufactured by Yellow Springs Instrument Company of Yellow Springs, Ohio. The output of this transmitter is a resistance signal which is provided to the temperature signal conditioner 137 which converts the signal into a voltage signal. This voltage is provided to an additional section of the air flow A/D converter 105 to be converted from an analog signal into a digital signal which is supplied to the computer interface 97, which in turn provides it to the computer 28. The absolute pressure is sensed by an absolute pressure transducer 141 which converts the pressure into a voltage signal. This voltage signal is supplied to the second air flow signal conditioner 138 whose output is supplied to an additional section of the air flow A/D converter 105, which in turn supplies a digital signal to the computer interface 97, and thence is supplied to the computer 28. The computer utilizes the values of the differential pressure, absolute pressure, and temperature in calculating the actual mass air flow entering the carburetor. If this value is different from the desired air flow, the computer provides an output signal to the computer interface 97, which provides a TTL logic signal to the throttle circuit such as Model No. STM 1800 as manufactured by The Superior Electric Company of Bristol, Connecticut. The output provides the signal to the throttle positioner 76 causing the throttle plate 78 to move to the desired postion.

FIG. 13 is substantially the same in operation as FIG. 11, except subsonic nozzles 145 are used to measure the volumetric air flow instead of the laminar flow tubes 143. Since subsonic nozzles are also a volumetric flow device, it is necessary to know the absolute pressure and the temperature of the air entering the nozzles for the calculation of mass air flow. When these volumetric flow devices are used for measuring air flow, it is desirable that the pressure of the air entering the laminar flow tubes or subsonic nozzles be essentially constant. When the test stand is situated in a room where the environment is controlled, the air measurement sensors are normally located upstream of the hood pressure valve 133. For this situation, the air flow measurement sensors are shown as 136 in FIG. 10, the laminar flow tubes 143 in FIG. 12, and subsonic nozzles as 145 when used in the system shown in FIG. 5.

Figure 15:
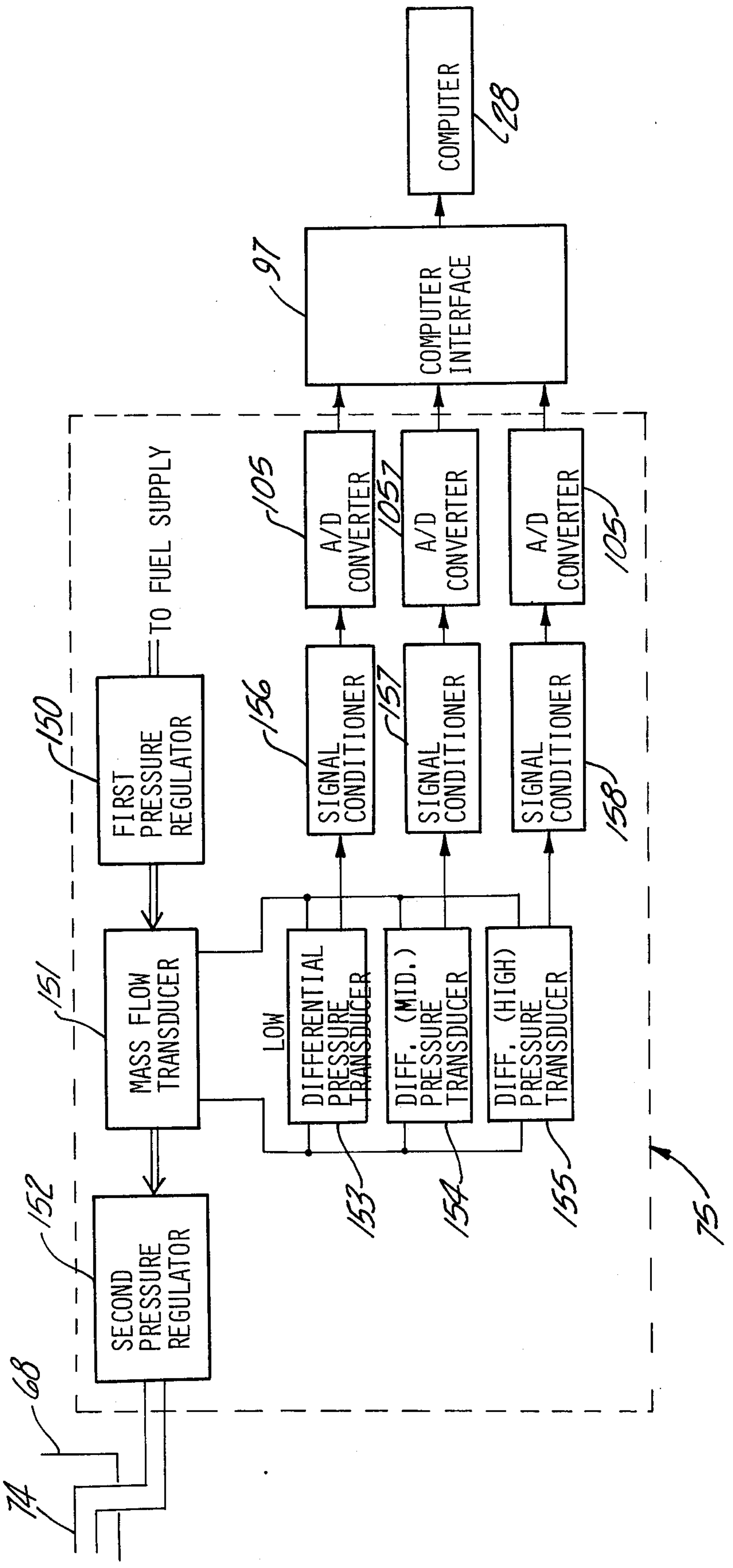
FIG. 15 is a diagrammatic view of the fuel flow measurement system as shown in FIGS. 4 and 5, and embodying a mass flow transducer for use in controlling and measuring fuel flow.

The fuel flow measurement system 75 is shown in more detail in FIG. 15. The fuel from the fuel supply is fed through a first pressure regulator 150 in order that a stable fuel pressure be provided to the fuel flow transducer. In this figure, the fuel flow transducer is a mass flow transducer 151 such as a Model No. 10 manufactured by Flotron Inc., Patterson, New Jersey. The fuel flow through the transducer proceeds through a second pressure regulator 152 from which the pressure of fuel supplied to the carburetor is further stabilized and can be adjusted to the desired value. The mass fuel flow through the transducer 151 provides a differential pressure output which is proportional to the mass flow. Normally three differential pressure transducers 153, 154, and 155 are provided to sense this differential pressure and adequately cover the range of flow measurement on a laboratory carburetor flow bench. The outputs of these transducers are current signals which are fed to the fuel pressure signal conditioners 156–158 respectively, which convert the current signals to voltage signals which are supplied to different sections of the A/D converter 105. Digital outputs from the A/D converter are supplied to the computer interface 97 and then to the computer 28 for calculation of the mass fuel flow entering the carburetor.

Figure 16:
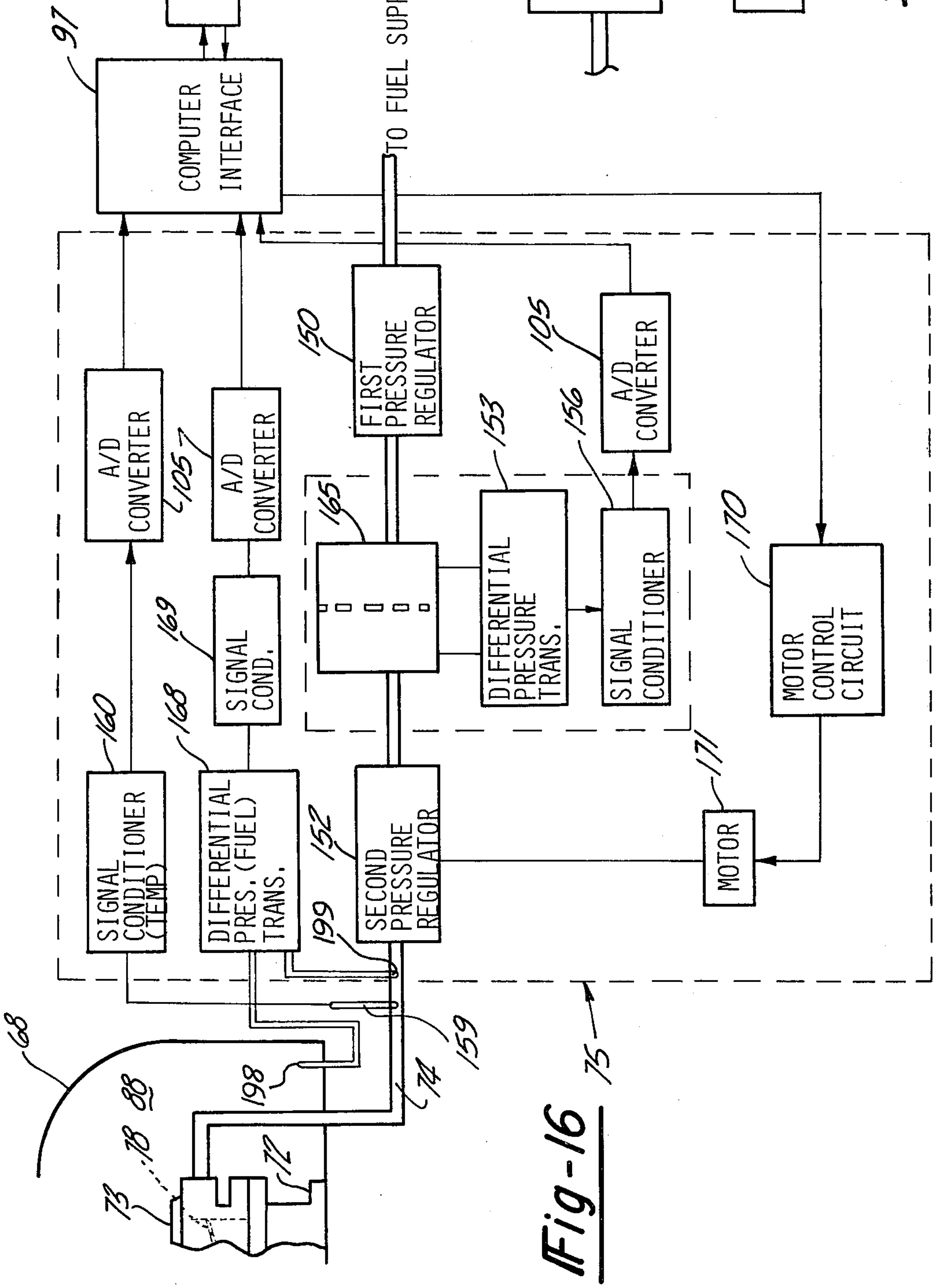
FIG. 16 is a diagrammatic view showing a modification of the fuel flow measurement system shown in FIG. 15 with orifices being used in place of the mass transducer to measure the rate of fuel flow, and showing in addition apparatus for fuel pressure control and fuel temperature measurement.

In FIG. 16 there is shown in a volumetric fuel flow transducer using a set of orifices. In this case, the differential pressure across the orifices varies approximately in proportion to the square of the volumetric fuel flow through the orifices 165. The differential pressure is sensed by a differential pressure transmitter 153 similar to that shown in FIG. 15. When a volumetric fuel flow transmitter is used it is also necessary that fuel temperature be measured in order that the mass fuel flow may be calculated. A temperature probe 159 senses the temperature of the fuel entering the carburetor and supplies a resistance signal to the temperature signal conditioner 160 which supplies a voltage signal to an additional section of the A/D converter 105, which in turn provides a digital signal through the computer interface 97 and thus to the computer 28.

Figure 17:
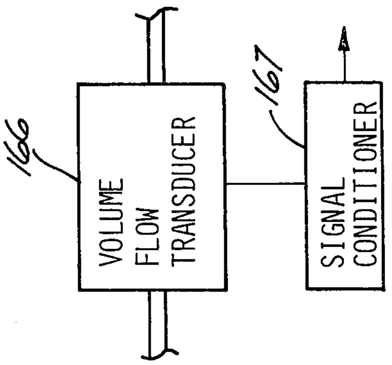
FIG. 17 is a partial diagrammatic view of a modification of FIG. 16, wherein a volume flow transducer is used in place of the orifices for the measurement of fuel flow.

In FIG. 17, the fuel flow transmitter is a volumetric flow transducer sucha as Model No. 1214 manufactured by Fluidyne Instrumentation of Oakland, California, the output signal of which is a voltage signal which is proportional to the volumetric flow through the transmitter. This voltage signal is fed to a signal conditioner 167 whose output is supplied to the A/D converter 105 as shown in FIG. 16.

Up to this point, the functions described for the apparatus in FIG. 16 are all the same as those described for FIG. 15, namely measuring the fuel flow through the carburetor. However, in some test applications it has been found desirable to control the pressure going to the carburetor to simulate the pressure for each test position as closely as possible to what it should be in the automobile engine for each test point. While such circuitry could be just as easily added to FIG. 15 as to FIG. 16, for ease of understanding, I shall continue on and describe it in relation to FIG. 16, with the understanding that it is well within the scope of the present invention to add such circuitry to FIGS. 15 and 17. While FIG. 16 has the same second pressure regulator 152 as is present in FIG. 15, in this instance, the second pressure regulator is not manually set for the particular fuel flow, but is controlled by the computer in response to a measurement of the actual fuel pressure present in the carburetor 73 at any given time. Such a measurement of fuel pressure is obtained by a differential fuel pressure transmitter 168 having a first proble 198 and a second probe 199 which measures the difference between the pressure in the test chamber 88 and the fuel line 74. A pressure signal from the differential fuel pressure transmitter 168 is supplied to the fuel pressure signal conditioner 169 which converts it to a current signal. This signal is in turn supplied to an additional section of the A/D converter 105 where it is changed from an analog into a digital signal which is supplied to the computer interface 97 and thus to computer 28 for the calculation of fuel pressure. Where the computer is to control fuel pressure, the computer 28 supplies an output signal to the computer interface 97 which converts the signal into one useable in the system. The signal from the computer interface 97 will instruct the motor control circuit 170 to operate the motor in a direction that raises or lowers the fuel pressure in a manner to bring it closer to the desired value.

While until this point, most of the description has dealt with a description of the various subsystems used in the performance of a carburetor test according to the present invention it must be realized that it is the unique combination of the various subsystems into a unitary test stand for performing laboratory tests of carburetors at any practicable number of test points at any practical altitude settings which has solved long standing problems in the carburetor art.

Therefore, a description of at least one method according to which the entire test stand may operate is felt mandatory for an understanding of the present invention. Such a method is illustrated by a flow chart shown in FIG. 28. After starting the test, and depending on the particular test, whether it be a Balance Box carburetor test, a constant manifold vacuum test or a test at a specific manifold vacuum, and depending on the configuration of the equipment, and more particularly whether the system is equipped with a manifold vacuum bypass valve control the computer 28 will calculate as necessary the values or proportional band, reset time and derivative time which will give the optimum control possible for the hood pressure control valve 133, the manifold vacuum in-line valve 107 and the manifold vacuum bypass valve 108. From these values, the computer will then set the output for the first test point for the hood pressure, manifold vacuum in-line valve, manifold vacuum bypass valve (if used), the throttle position and the fuel pressure.

After the system has paused for approximately one-half second, the computer 28 will calculate the hood pressure, the manifold vacuum, the mass air flow rate, the mass fuel flow rate, the fuel pressure and the air/fuel ratio.

The system will continue to recalculate the values of proportional band, reset time and derivative time, and will reset the outputs as described above and recalculate the values of hood pressure, manifold vacuum, mass air flow, mass fuel flow, fuel pressure and air/fuel ratio at approximately one-half second intervals until it is determined that the values for the particular test point are acceptable and have stabilized sufficiently so that the test can proceed.

In order to get a meaningful value for the particular test point it is desirable to average a number of values for the various quantities involved. For this purpose the system has a built in cycle counter which is used to determine the number of readings that are used to determine the average. When the test starts, the cycle counter will read zero and, if for example the average of ten readings are desired for the first test point, when the cycle counter equals ten the averaging process for the first test point will stop. In order to obtain these averages, if the cycle count is at zero, the system will look at the values for hood pressure, manifold vacuum, etc. and see if these values are acceptable.

Assuming for the moment that all the values are acceptable, the cycle counter will then add one to the cycle count and it will next check to see if the cycle count is equal to the total count desired. In this case, since the cycle count is one and the total count desired is ten, it is obvious that the cycle count is not equal to the total count desired. Therefore, the system will again pause for one-half second and it will calculate all the desired values again. Since the cycle count is not equal to zero the check to make sure all values are acceptable will not be performed, but instead one is again added to the cycle count and the process will continue until ten values for each desired quantity have been calculated. At this time the average of the ten values for each quantity are calculated, the results displayed and printed out for other use if desired, and the cycle counter set to zero in preparation to go to the next test point.

Before going further with a description of the system, it should be noted that provision has been made for the situation where the values are unacceptable or have failed to stabilize when faulty carburetors are being tested. Presuming that the carburetor has failed from the beginning of the test, when the system checks to see if the cycle count is zero and finds that it is and then checks to see if all values are acceptable and finds that they are not, one of two things can happen. If the time limit put into the system to prevent a defective carburetor from tying up the test system has not expired, the test will continue as above with the calculation of the proportional band, reset time, and derivative time for the various controllers and the setting of the output for the hood pressure valve and manifold vacuum in-line valve, etc. in an attempt to reach an acceptable condition. If the condition does not become acceptable, and the time limit expires, the system will add one to the cycle count and proceed to the calculation loop, for the calculation of the average hood pressure, manifold vacuum, mass air flow, mass fuel flow, fuel pressure, and air/fuel ratio. The test experiences a minimum delay because it no longer checks to see if the values are acceptable, and the cycle counter will reach the total count rapidly, and the average values will be quickly calculated and displayed, even through the carburetor is not operating properly.

At this point since the values are not acceptable, provisions have been made in the test stand to indicate this visually as well as with the values which are printed out.

At this point then, whether the values for the previous test points are acceptable or not, the system sets the cycle count to zero and is prepared to proceed to the next test point. If the test has been automated this is exactly what the system will do and the operation of the test system just described will be repeated for all test points.

If the carburetor is only being tested at one point, or if operator intervention is necessary to proceed from one point to the next, the system can either shut itself down or can be left flowing at the particular test point, with it being the responsibility of the operator to stop the test or, if desired, repeat the test a number of times at the sametest point.

With the present test stand having the capability to continuously monitor and maintain a desired hood pressure, manifold vacuum, air flow, and fuel pressure for each test point, the present invention is able to test a carburetor far more accurately than was heretofore possible, and in a manner which is faster and more desirable than anything available in the prior art.

By virtue of the above-described constructions, the objects of the present invention listed above and numerous additional advantages are attained.

I claim:

1. A method of testing carburetors at any desired number of points in the carburetor's operating range using subsonic flow to determine the air flow and fuel flow rate through the test carburetor, said method including the steps of providing a suitable test stand on which to mount a carburetor, providing a suitable test chamber above said stand adapted to sealingly enclose said carburetor, continuously controlling the pressure inside said test chamber with an optimized rate, reset and proportional control wherein the derivative time, reset time and proportional band values are continuously and automatically modified to be optimum so as to quickly produce the desired pressure at each point at which said carburetor test will take place in the shortest possible time, simultaneously controlling the pressure of the fuel entering the carburetor, simultaneously inducing air flow through said carburetor by providing a vacuum downstream of said carburetor, simultaneously determining the flow rate of air and fuel entering the carburetor, and simultaneously rotating the carburetor throttle plate until a desired predetermined test condition is achieved.

2. The method defined in claim 1, and including the step of determining the mass air flow rate entering the carburetor.

3. The method defined in claim 2, and including the step of determining the mass fuel flow rate entering the carburetor.

4. The method defined in claim 3, and including the step of calculating the air/fuel ratio from the values of mass air flow and mass fuel flow previously determined.

5. The method as defined in claim 4, wherein the determining of the mass air flow rate includes the steps of passing said induced air flow through a flow restricting device en route to the carburetor, sensing the differential pressure across said device, sensing the pressure and temperature of the air flowing through said restrictive flow device, calculating the actual mass flow rate of air entering said test chamber from the values of differential pressure, temperature, and absolute pressure.

6. The method as defined in claim 5, wherein said restrictive flow device is one or more subsonic nozzles.

7. The method as defined in claim 6, with the carburetor system being used in a controlled environment room and keeping the pressure of the air entering said subsonic nozzles constant.

8. The method as defined in claim 6, with the carburetor test system drawing air from an air supply system having controlled temperature, pressure and humidity and keeping the pressure of the air entering the system constant.

9. The method as defined in claim 5, wherein said restrictive flow device is in the form of one or more laminar flow tubes.

10. The method as defined in claim 9, with the carburetor system being used in a controlled environment room and keeping the pressure of the air entering said laminar flow tubes constant.

11. The method as defined in claim 9, with the carburetor test system drawing air from an air supply system having controlled temperature, pressure and humidity and keeping the pressure of the air entering the system constant.

12. The method as defined in claim 5, wherein the determining of the mass fuel flow rate includes the steps of providing a fuel supply, passing the fuel through a mass fuel flow transducer en route to the carburetor, measuring the differential pressure across the fuel flow transducer and calculating the actual mass fuel flow rate from the differential pressure.

13. The method defined in claim 12, wherein said mass fuel flow transducer and differential pressure transducer is replaced by a volumetric flow transducer and including the steps of measuring the temperature of the fuel flowing to said carburetor and calculating the mass fuel flow rate from said measured values.

14. The method defined in claim 12, wherein the mass fuel flow transducer is replaced by a set of orifices, and the differential pressure is measured by a differential pressure transducer and including the steps of measuring the temperature of the fuel entering the carburetor and calculating the mass fuel flow rate from said measured values.

15. The method defined in claim 12, wherein the measuring of the actual fuel pressure entering the carburetor is performed by measuring the differential pressure between said transducer and the air pressure inside said test chamber and calculating the fuel pressure from said measurements.

16. The method defined in claim 15, and including the steps of automatically controlling the actual fuel pressure entering the carburetor at any time, including the steps of measuring said fuel pressure, comparing said fuel pressure with the desired fuel pressure and regulating the fuel pressure at a point past said differential pressure transducer, if necessary, to achieve said desired fuel pressure.

17. The method defined in claim 12, and including the steps of measuring and calculating manifold vacuum across said carburetor.

18. The method defined in claim 17, with the controlling of manifold vacuum including the steps of measuring and calculating the actual manifold vacuum present at any given time, comparing the actual value with the desired value, providing an in-line valve means adapted to operate with an optimum combination of rate, reset and proportional control wherein the derivative time, reset time, and proportional band values are continuously and automatically modified to be optimum for each test point to continuously control the manifold vacuum below the carburetor, providing said in-line valve means with said optimum control for each test point, and adjusting said valve means as necessary to achieve the desired manifold vacuum.

19. The method as defined in claim 18, including the steps of providing a bypass valve means and controlling said bypass valve means in response to a signal related to the operation of said in-line valve means to keep said in-line valve means operating within a desired portion of its operating range regardless of the manifold vacuum required.

20. The method as defined in claim 19, with said bypass valve means adapted to continuously operate with an optimum combination of rate, reset and proportional control wherein the derivative time, reset time, and proportional band values are continuously and automatically modified to be optimum at each test point, supplying said valve means with said optimum control for each test point, and controlling said bypass valve means in response to a signal related to the operation of said in-line valve means to keep said in-line valve means operating within a desired portion of its operation range regardless of the required manifold vacuum.

21. The method as defined in claim 20, including the step of controlling the air entering said system by a valve means to keep the pressure inside the test chamber, which is the hood pressure, constant.

22. The method defined in claim 21, with said air being drawn from an air supply conditioned as to pressure, temperature and humidity and said valve means being upstream of said air flow measuring means.

23. The method as defined in claim 22, with the air being drawn from a controlled environment room and having said valve downstream from said air flow measuring means.

24. The method defined in claim 21, and including the steps of starting the carburetor laboratory test, supplying said manifold vacuum in-line valve means, said manifold vacuum bypass valve means and the valve means for controlling the hood pressure inside the test chamber, with the optimum combination of rate, reset and proportional control for each test point by continuously and automatically calculating the proportional band, reset time and derivative time for each of said valve means, setting an output for said valves for each of said valve means as required for each test point, setting the throttle position and the fuel pressure required for each test point, pausing for a predetermined time period, calculating the hood pressure, manifold vacuum, mass air flow, mass fuel flow, fuel pressure and air/fuel ratio for each test point, providing a cycle count which is set to zero at the start of each test, checking to see if the cycle count is equal to zero, and if the count is equal to zero, checking to see if all values are acceptable, if all values are acceptable, checking to see if the test time limit has expired and if the test time limit has not expired, continuing to recalculate the values of proportional band, reset time and derivative time for each of said valve means and resetting said outputs and recalculating said values at intervals equal to said predetermined time until said values are acceptable or said time limit has expired, thus continuously optimizing the control of said valve means to obtain acceptable values quickly.

25. The method as defined in claim 24, including the steps of finding all the values acceptable or finding that the test time limit has expired and adding one to said cycle counter, checking to see if said cycle counter is equal to the predetermined total cycle count desired, it said cycle count is not equal to the total count desired pausing for an interval equal to said predetermined time, again calculating said hood pressure, said manifold vacuum, said mass air flow, said mass fuel flow, said fuel pressure and said air/fuel ratio, checking that said cycle count is not equal to zero and continuing to add one to said cycle count and recalculating said values until said cycle count is equal to the said predetermined total count desired, and calculating the average of a number of said values equal to the total cycle count desired.

26. The method defined in claim 25, and including the steps of displaying the average values of said hood pressure, manifold vacuum, mass air flow, mass fuel flow, fuel pressure, and air/fuel ratio, resetting said cycle counter to zero and checking to see if an automatic cycle is in use and stopping said test if said automatic cycle is not in use, or if said cycle is in use, proceeding to start the test for the next test point.

27. The method defined in claim 1, and including the step of determining the mass fuel flow rate entering the carburetor.

28. The method defined in claim 1, and including the steps of measuring and calculating manifold vacuum across said carburetor.

29. The method defined in claim 28, with the controlling of manifold vacuum including the steps of measuring and calculating the actual manifold vacuum present at any given time, comparing the actual value with the desired value, providing an in-line valve means adapted to operate with an optimum combination of rate, reset and proportional control wherein the derivative time, reset time, and proportional band values are continuously and automatically modified to be optimum for each test point to continuously control the manifold vacuum below the carburetor, providing said in-line valve means with sad optimum control for each test point, and adjusting said valve means as necessary to achieve the desired manifold vacuum.

30. The method as defined in claim 29, including the steps of providing a bypass valve means and controlling said bypass valve means in response to a signal related to the operation of said in-line valve means to keep said in-line valve means operating within a desired portion of its operating range regardless of the manifold vacuum required.

31. The method as defined in claim 30, with said bypass valve means adapted to continuously operate with an optimum combination of rate, reset and proportional control wherein the derivative time, reset time, and proportional band values are continuously and automatically modified to be optimum for each test point, supplying said valve means with said optimum control for each test point, and controlling said bypass valve means in response to a signal related to the combination of said in-line valve means to keep said in-line valve means operating within a desired portion of its operation range regardless of the required manifold vacuum.

32. The method as defined in claim 1, including the step of controlling the air entering said system by a valve means to keep the pressure inside the test chamber, which is the hood pressure, constant.

33. The method defined in claim 32, with said air being drawn from an air supply conditioned as to pressure, temperature and humidity and said valve means being upstream of said air flow measuring means.

34. The method as defined in claim 33, with the air being drawn from a controlled environment room and having said valve downstream from said air flow measuring means.

35. The method defined in claim 1, and including the steps of supplying a means adapted to control the pressure inside said test chamber, also known as hood pressure, and a means for providing a vacuum downstream of said carburetor, providing that both of said means are adapted to operate with an optimum combination of rate, reset, and proportional control for each test point, starting the carburetor laboratory test, supplying both of said means with the optimum combination of rate, reset and proportional control for each test point by continuously and automatically calculating the proportional band, reset time and derivative time for each of said means, setting an output for said means as required for each test point, setting the throttle position and the fuel pressure required for each test point, pausing for a predetermined time period, calculating the hood pressure, manifold vacuum, mass air flow, mass fuel flow, fuel pressure, and air/fuel ratio for each test point, providing a cycle count which is set to zero at the start of each test, checking to see if the cycle count is equal to zero, and if the count is equal to zero, checking to see if all values are acceptable, if all values are acceptable, checking to see if the test time limit has expired and if the test time limit has not expired, continuing to recalculate the values of proportional band, reset time and derivative time for each of said means, and resetting said outputs and recalculating said values at intervals equal to said predetermined time until said values are acceptable or said time limit has expired, thus continuously optimizing the control of said means to obtain acceptable values quickly.

36. The method as defined in claim 35, including the steps of finding all the values acceptable or finding that the test time limit has expired and adding one to said cycle counter, checking to see if said cycle counter is equal to the predetermined total cycle count desired, if said cycle count is not equal to the total count desired pausing for an interval equal to said predetermined time, again calculating said hood pressure, said manifold vacuum, said mass air flow, said mass fuel flow, said fuel pressure and said air/fuel ratio, checking that said cycle count is not equal to zero and continuing to add one to said cycle count and recalculating said values until said cycle count is equal to the said predetermined total count desired, and calculating the average of a number of said values equal to the total cycle count desired.

37. The method defined in claim 36, and including the steps of displaying the average values of said hood pressure, manifold vacuum, mass air flow, mass fuel flow, fuel pressure, and air/fuel ratio, resetting said cycle counter to zero and checking to see if an automatic cycle is in use and stop said test if said automatic cycle is not in use, or if said cycle is in use, proceeding to start the test for the next test point.

38. An apparatus for testing carburetors at any number of desired points in the carburetor's operating range using subsonic flow to determine the air flow and fuel flow through said carburetor, said apparatus including a hollow sealed chamber adapted to receive sealingly at the outside thereof a test carburetor with the throat of said carburetor communicating with the inlet of said chamber and a vacuum source communicating with the outlet thereof, means to hold said carburetor in place during said test, means to provide an enclosed sealed test chamber having an inlet above said hollow chamber to surround said carburetor, means to induce an air flow through the inlet of said test chamber and thus through said test carburetor by providing a vacuum producing means downstream of said hollow chamber, means for continuously controlling the pressure inside said test chamber to obtain a desired hood pressure at each point said carburetor is to be tested, with said pressure controlling means having an optimized combination of rate, reset and proportional control wherein the derivative time, reset time and proportional band values are continuously and automatically modified to be optimum so as to quickly produce the desired pressure for each of said carburetor test points, means to control the pressure of the fuel entering the carburetor, means to simultaneously determine the flow rate of air and fuel entering the carburetor, and means to simultaneously rotate the throttle plate of said carburetor until a desired predetermined air flow is achieved.

39. The apparatus defined in claim 38, and including means to determine the mass fuel flow rate entering the carburetor.

40. The apparatus defined in claim 39, and including means to determine the mass air flow rate entering the carburetor.

41. The apparatus defined in claim 40, and including means to calculate the air/fuel ratio of said carburetor from the values of mass air flow and mass fuel flow.

42. The apparatus as defined in claim 41, wherein the means to induce an air flow through the inlet of said chamber including a vacuum producing means, a first conduit connected to an air supply controlled as to temperature, pressure and humidity, an enlarged chamber having an inlet and an outlet, with the inlet thereof connected to said first conduit, a second conduit connected to said outlet with the other end of said second conduit communicating with said test chamber, a wall dividing said enlarged chamber into two portions and at least one flow restricting device mounted through said wall to allow air to pass through said chamber, an air flow differential pressure transducer to sense the pressure drop across said flow restricting device and to provide a signal related to said pressure drop, means to obtain the absolute pressure upstream of said flow restricting device, means to sense the temperature upstream of said flow restricting device, means to calculate from the differential pressure, absolute pressure and temperature the actual mass flow rate of air passing through said flow restricting device.

43. The apparatus defined in claim 42, wherein said flow restricting device is a laminar flow tube.

44. The apparatus defined in claim 43, wherein the means to sense the differential pressure across said laminar flow tubes includes an air flow differential pressure transducer connected across said flow tubes and adapted to provide a signal related to the pressure drop across said flow tubes, an air flow signal conditioner connected to said differential pressure transducer to convert said signal to one useable in the system and an analog-to-digital converter, one input of which is connected to said air flow signal conditioner, and the corresponding output of which is connected to the means which calculates said actual mass air flow rate.

45. The apparatus defined in claim 44, wherein said means to calculate said actual mass air flow rate include a computer and a computer interface.

46. The apparatus defined in claim 43, wherein the means to measure the absolute pressure upstream of said laminar flow tubes includes an absolute pressure transducer, a second air flow signal conditioner connected to said absolute pressure transducer to convert the signal therefrom to a signal useable in the system, and an analog-to-digital converter one input of which is connected to said second air flow signal conditioner and the corresponding output of which is connected to said means which calculates said actual mass air flow rate.

47. The apparatus defined in claim 46, wherein said means which calculate said actual mass air flow rate include a computer and a computer interface.

48. The apparatus defined in claim 43, wherein the means to measure said temperature of the air entering said laminar flow tubes includes a temperature transducer communicating with the upstream side of said flow tube and adapted to provide an output signal related to the temperature of said air, a temperature signal conditioner connected to said temperature transducer to convert said output signal to a signal useable in said system, and an analog-to-digital converter one input of which is connected to said temperature signal conditioner and the corresponding output of which is connected to said means which calculates said actual mass air flow rate.

49. The apparatus defined in claim 48, wherein said means which calculates said actual mass air flow rate include a computer and a computer interface.

50. The apparatus defined in claim 42, with flow restricting device being in the form of at least one laminar flow tube.

51. The apparatus defined in claim 42, wherein said means for measuring and providing a predetermined air flow is drawing air from a controlled environment room and the position of said air control valve and said hollow chamber are reversed.

52. The apparatus defined in claim 51, wherein the flow restricting device comprises at least one subsonic nozzle.

53. The apparatus defined in claim 51, wherein the flow restricing device is at least one laminar flow tube.

54. The apparatus defined in claim 42, wherein said means to calculate from the differential pressure, absolute pressure and temperature the actual mass flow rate of air passing through said flow restricting device include a computer and a computer interface.

55. The apparatus defined in claim 41, wherein said means to calculate the air-fuel ratio include a computer and a computer interface.

56. The apparatus as defined in claim 39, and including means to provide fuel to the test system, a conduit connected at one end of said fuel supply means, a first pressure regulator connected to the other end of said conduit, a mass fuel flow transducer operatively connected to said first pressure regulator, a second pressure regulator communicating at one end with said mass fuel flow transducer and at the other end with said carburetor, means to measure the differential pressure across said mass fuel flow transducer, and means to calculate from said differential pressure, the mass fuel flow rate entering the carburetor.

57. The apparatus defined in claim 56, including means to measure the temperature of said fuel entering said carburetor wherein said mass flow transducer is replaced by a set of orifices and a differential pressure transmitter measures the pressure across said orifices, and means to calculate from said differential pressure and temperature the mass fuel flow rate entering said carburetor.

58. The apparatus defined in claim 57, wherein said orifices and differential pressure transmitter are replaced by a volume flow transducer.

59. The apparatus defined in claim 57, and including means to measure the fuel pressure entering the carburetor, said apparatus including a differential fuel pressure transducer to measure the pressure of the fuel going into the carburetor at any given time and to provide an output signal related to the pressure of said fuel, a first differential fuel pressure transducer probe connected to said transducer and communicating with the interior of said test chamber, and a second probe communicating with said fuel line immediately before said fuel enters the carburetor, a fuel pressure signal conditioner connected to said differential fuel pressure transducer to convert said signal useable in said system, an analog-to-digital converter, one input of which is connected to said fuel pressure signal conditioner and the corresponding output of which is connected to the means to calculate said fuel pressure.

60. The apparatus defined in claim 59, and including means to automatically control the fuel pressure entering the carburetor, said means providing an output signal based on a comparison of the actual and desired fuel pressures, a motor control circuit connected to said fuel pressure calculating means, a motor connected to said motor circuit and adapted to rotate said second pressure regulator in an appropriate direction to bring the actual fuel pressure closer to said desired fuel pressure.

61. The apparatus defined in claim 60, wherein said means to automatically control the fuel pressure entering the carburetor and said fuel pressure calculating means include a computer and a computer interface.

62. The apparatus defined in claim 59, wherein said means to calculate said fuel pressure include a computer and a computer interface.

63. The apparatus defined in claim 57, wherein said means to calculate from said differential pressure and temperature the mass fuel flow rate entering said carburetor include a computer and a computer interface.

64. The apparatus defined in claim 56, wherein said means to calculate from said differential pressure the mass fuel flow rate entering the carburetor include a computer and a computer interface.

65. The apparatus as defined in claim 38, including means to measure the manifold vacuum comprising a conduit communicating at one end with the carburetor throat and at the other end with a vacuum source, means to measure the drop in pressure across said carburetor, means to calculate from said differential pressure the actual manifold vacuum present at any given time.

66. The apparatus defined in claim 65, wherein said means for measuring the pressure drop across said carburetor include a differential pressure transducer connected across said carburetor and adapted to provide an output signal related to said pressure drop, a signal conditioner connected to said differential pressure transducer and an analog-to-digital converter one input of which is connected to said signal conditioner and whose output is connected to said manifold vacuum calculation means.

67. The apparatus defined in claim 66, and including means to compare the actual manifold vacuum with a desired manifold vacuum, an inlet valve means adapted to operate with an optimum combination of rate, reset and proportional control wherein the derivative time, reset time, and proportional band values are continuously and automatically modified to be optimum so as to quickly produce the desired pressure at each point at which said carburetor test will take place interposed in said conduit between said conduit and said vacuum source, means to supply said optimum control for each test point to said valve, and means to adjust said valve means as necessary to achieve said desired manifold vacuum.

68. The apparatus defined in claim 67, wherein said adjusting means include a first manifold vacuum digital-to-analog converter one input of which is connected to said manifold vacuum calculation means and which has an output, a voltage-to-current transmitter connected to the output of said digital-to-analog converter and having an output, a current-to-pressure transmitter whose input is connected to said voltage-to-current transmitter and whose output is connected to said in-line valve means.

69. The apparatus as defined in claim 68, and including means to keep said in-line valve means operating within a desired portion of its operating range regardless of the manifold vacuum required.

70. The apparatus defined in claim 69, wherein said means to keep said in-line valve means in said desired portion of its operating means includes a control circuit having an input connected from said first manifold vacuum digital-to-analog converter and adapted to provide an output signal, a second manifold vacuum voltage-to-current transmitter connected from the output of said control circuit, a second manifold vacuum current-to-pressure transmitter connected to the output of said voltage-to-current transmitter and having an output signal, a bypass conduit communicating with said conduit communicating with said carburetor throat downstream of said in-line valve means, and a bypass valve means interposed in said bypass conduit and connected to the output of said second manifold vacuum current-to-pressure transmitter.

71. The apparatus defined in claim 70, wherein said control circuit includes a dual analog comparator receiving an input signal from the first manifold vacuum digital-to-analog converter, dual analog limits connected to said dual analog comparator, a first NAND gate one input of which is connected to said dual analog comparator, a second NAND gate one of whose inputs is connected to said dual analog comparator, a dual digital comparator having two outputs, one each of which is connected to the other input of said first and second NAND gates, an up-down counter having a low and a high input, the low input connected to the output of said first NAND gate and whose high input is connected to the output of said second NAND gate, a third NAND gate whose inputs are connected to the outputs of said first NAND gate and said second NAND gate and whose output is connected to the enable input of said up-down counter, a dual digital limits connected to the input of said dual digital comparator, the input of said dual digital comparator also being connected to the output of said up-down counter, an oscillator being connected to said up-down counter and a dedicated digital-to-analog converter connected to the output of said up-down counter and supplying an output signal to said second manifold vacuum voltage-to-current transmitter, all adapted to open and close said bypass valve means in response to changes in the position of said in-line valve means to keep said in-line valve neans within said desired portion of its operating range.

72. The apparatus defined in claim 70, wherein said control circuit is replaced by a second digital-to-analog converter having an input and an output, the input of which is connected to said manifold vacuum calculation means, and the output of which is connected to said second manifold vacuum voltage-to-current transmitter.

73. The apparatus defined in claim 72, wherein said manifold vacuum calculation means include a computer and a computer interface.

74. The apparatus defined in claim 68, wherein said manifold vacuum calculation means include a computer and a computer interface.

75. The apparatus defined in claim 67, wherein said means to compare the actual manifold vacuum with a desired manifold vacuum and said means to supply said optimum control for each test point to said valve include a computer and a computer interface.

76. The apparatus defined in claim 66, wherein said manifold vacuum calculation means include a computer and a computer interface.

77. The apparatus defined in claim 65, wherein said means to calculate from said differential pressure the actual manifold vacuum present at any given time include a computer and a computer interface.

78. The apparatus defined in claim 38, and including means to measure the hood pressure.

79. The apparatus defined in claim 78, wherein said hood pressure measurement means include an absolute pressure transducer operatively connected to said test chamber, a hood pressure signal conditioner connected to said absolute pressure transducer to change the signal from said transducer to one useable in the system, an analog-to-digital converter one input of which is connected to said hood pressure signal conditioner and the other output of which is connected to a means to calculate said hood pressure.

80. The apparatus defined in claim 79 and having means to control said hood pressure, said control means including a hood pressure digital-to-analog converter connected to said hood pressure calculation means to receive a signal based on a comparison of the actual measured hood pressure and the desired hood pressure, a hood pressure voltage-to-current transmitter to convert said signal into a current signal, and a hood pressure valve means connected to said voltage-to-current transmitter and interposed in said first conduit immediately downstream of said air supply before said air flow determining means.

81. The apparatus defined in claim 80, wherein said hood pressure valve means are downstream of said air flow determining means.

82. The apparatus defined in claim 80, wherein said hood pressure calculation means include a computer and a computer interface.

83. The apparatus defined in claim 79, wherein said means to calculate said hood pressure include a computer and a computer interface.

84. The apparatus defined in claim 38, and including means to control the hood pressure, and to provide a vacuum downstream of said carburetor, both of said means operating with an optimum value of rate, reset and proportional control for each test point, means to supply both of said means with the optimum value of rate, reset and proportional control for each test point by calculating the proportional band, reset time and derivative time for each of said means, means to set an output for each of said means as required for each test point, means to set the throttle position and the fuel pressure required for each test point, means to pause for a predetermined time period, means to calculate the hood pressure, manifold vacuum, mass air flow, mass fuel flow, fuel pressure, and air/fuel ratio for each test point, a cycle counting means which is set to zero at the start of each test, means to check to see if the cycle count is equal to zero, and if the count is equal to zero, means to check to see if all values are acceptable, and if all values are acceptable to check to see if the test time limit has expired and if the test time limit has not expired, means to continually recalculate the values of proportional band, reset time and derivative time for each of said means and resetting said outputs and recalculating said values at intervals equal to said predetermined time until said values are acceptable or said time limit has expired, thus continuously optimizing the control of said valve means to obtain acceptable values quickly.

85. The apparatus as defined in claim 84, including means to find all the values acceptable, means to find that the test time limit has expired, means to add one to said cycle counter, means to check if said cycle counter is equal to the predetermined total cycle count desired and if said cycle count is not equal to the total count desired, means to pause for an interval equal to said predetermined time, means to again calculate said hood pressure, said manifold vacuum, said mass air flow, said mass fuel flow, said fuel pressure and said air/fuel ratio, means to check that said cycle count is not equal to zero and to continue to add one to said cycle count and recalculate said values until said cycle count is equal to the said predetermined total count desired, and means to calculate the average of a number of said values equal to the total cycle count desired.

86. The apparatus defined in claim 85, and including means to display the average values of said hood pressure, manifold vacuum, mass air flow, mass fuel flow, fuel pressure, and air/fuel ratio, means to reset said cycle counter to zero and to check if an automatic cycle is in use and stop said test if said automatic cycle is not in use, or if said cycle is in use, proceeding to start the test for the next test point.

87. The apparatus defined in claim 86 and including a computer and a computer interface to perform the calculation and control functions.

88. The apparatus defined in claim 84 and including a computer and a computer interface to perform the calculation and control functions.

89. The apparatus defined in claim 85 and including a computer and a computer interface to perform the calculation and control functions.

90. The apparatus defined in claim 38, wherein said pressure controlling means having an optimized combination of rate, reset, and proportional control for each point include a computer and a computer interface.

* * * * *